(12) United States Patent
Khoryaev et al.

(10) Patent No.: US 12,192,963 B2
(45) Date of Patent: Jan. 7, 2025

(54) RADIO (NR) DOWNLINK (DL) POSITIONING REFERENCE SIGNAL (PRS) DESIGN RESOURCE ALLOCATION AND MAPPING IN NR POSITIONING

(71) Applicant: APPLE INC., Cupertino, CA (US)

(72) Inventors: Alexey Khoryaev, Nizhny Novgorod (RU); Sergey Sosnin, Zavolzhie (RU); Dmitry Belov, Nizhny Novgorod (RU); Artyom Putilin, Kstovo (RU); Seunghee Han, San Jose, CA (US)

(73) Assignee: APPLE INC., Cupertino, CA (US)

( * ) Notice: Subject to any disclaimer, the term of this patent is extended or adjusted under 35 U.S.C. 154(b) by 719 days.

(21) Appl. No.: 17/593,076

(22) PCT Filed: Mar. 31, 2020

(86) PCT No.: PCT/US2020/026012
§ 371 (c)(1),
(2) Date: Sep. 8, 2021

(87) PCT Pub. No.: WO2020/205891
PCT Pub. Date: Oct. 8, 2020

(65) Prior Publication Data
US 2022/0191830 A1    Jun. 16, 2022

Related U.S. Application Data

(60) Provisional application No. 62/827,755, filed on Apr. 1, 2019.

(51) Int. Cl.
*H04W 72/02*    (2009.01)
*H04L 1/1607*    (2023.01)
(Continued)

(52) U.S. Cl.
CPC ........... *H04W 72/02* (2013.01); *H04L 1/1614* (2013.01); *H04L 5/0048* (2013.01); *H04L 5/0098* (2013.01); *H04W 72/0446* (2013.01)

(58) Field of Classification Search
CPC .............. H04W 72/02; H04W 72/0446; H04L 1/1614; H04L 5/0048; H04L 5/0098
See application file for complete search history.

(56) References Cited

U.S. PATENT DOCUMENTS

2012/0257575 A1    10/2012    Davydov et al.
2013/0294402 A1    11/2013    Yoon et al.
(Continued)

FOREIGN PATENT DOCUMENTS

CN    102388319 A    3/2012
CN    103460618 A    12/2013
(Continued)

OTHER PUBLICATIONS

PCT/US2020/026012, International Search Report and Written Opinion, Jul. 15, 2020, 15 pages.
(Continued)

*Primary Examiner* — Michael Thier
*Assistant Examiner* — Nevena Zecevic Sandhu
(74) *Attorney, Agent, or Firm* — Dorsey & Whitney LLP

(57) ABSTRACT

Devices and methods provide for transmitting downlink (DL) positioning reference signals (PRSs) in a wireless system. A DL PRS resource pool is configured and divided into a plurality of DL PRS resource sets. The DL PRS resource pool includes a periodically repeated amount of resources dedicated for DL PRS transmission by a plurality of gNBs in the wireless communication system. The plurality of DL PRS resource sets correspond to one or more gNB of the plurality of the gNBs. The DL PRSs are encoded for (Continued)

transmission on configured DL PRS resources within the plurality of DL PRS resource sets.

18 Claims, 14 Drawing Sheets

(51) Int. Cl.
*H04L 5/00* (2006.01)
*H04W 72/0446* (2023.01)

(56) References Cited

U.S. PATENT DOCUMENTS

| | | |
|---|---|---|
| 2013/0315168 A1 | 11/2013 | Frank et al. |
| 2015/0023265 A1 | 1/2015 | Park et al. |
| 2018/0124787 A1 | 5/2018 | Wang et al. |
| 2018/0279152 A1* | 9/2018 | Kim .................. H04W 24/10 |
| 2019/0149253 A1* | 5/2019 | Yoon .................. H04B 7/2621 |
| | | 370/252 |

FOREIGN PATENT DOCUMENTS

| | | |
|---|---|---|
| CN | 107750437 A | 3/2018 |
| CN | 107872257 A | 4/2018 |

OTHER PUBLICATIONS

CATT, "Further discussion of NR RAT-dependent DL Positioning", R1-1901980, 3GPP TSG RAN WG1 Meeting#96, Athens, Greece, Agenda Item 7.2.10.1.1, Feb. 25-Mar. 1, 2019, 30 pages.
Intel Corporation, "Analysis of Techniques for NR DL Positioning", R1-1900512, 3GPP TSG RAN WG1 Ad-Hoc Meeting 1901, Taipei, Taiwan, Agenda Item 7.2.10.1.1, Jan. 21-25, 2019, 25 pages.
Qualcomm Incorporated, "OTDOA positioning reference signal", R1-1702547, 3GPP TSG RAN WG1 Meeting #88, Athens, Greece, Agenda Item 7.2.4.1.1, Feb. 13-17, 2017, 4 pages.
Qualcomm Incorporated, "RAT-dependent DL-only NR positioning techniques", R1-1903018, 3GPP TSG RAN WG1 #96, Athens, Greece, Agenda Item 7.2.10.1.1, Feb. 25-Mar. 1, 2019, 11 pages.

* cited by examiner

RADIO (NR) DOWNLINK (DL) POSITIONING REFERENCE SIGNAL (PRS) DESIGN RESOURCE ALLOCATION AND MAPPING IN NR POSITIONING

CROSS-REFERENCE TO RELATED APPLICATION(S)

This application is a national stage filing under 35 U.S.C. § 371 of International Patent Application No. PCT/US2020/026012, filed Mar. 31, 2020, which claims the benefit of U.S. Provisional Application No. 62/827,755 filed Apr. 1, 2019, each of which is hereby incorporated by reference herein in its entirety.

TECHNICAL FIELD

This application relates generally to wireless communication systems, and more specifically to user equipment positioning.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

Knowledge of the position of a UE or a mobile user is useful for many consumer applications such as navigation, direction finding, asset tracking, Internet service, and location-based digital services. UE positional information at the network is also useful for law enforcement and emergency services. The position location of a mobile device may be estimated based on information gathered from various systems. In a wireless network, a transmitting device (e.g., a base station device) may transmit a positioning reference signal (PRS). A mobile device acquiring (receiving) PRSs transmitted by different base station devices may obtain signal-based measurements that may be used in computing a position location estimate of the mobile device, for example, by applying observed time difference of arrival (OTDOA) techniques.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

In certain embodiments disclosed herein, apparatus, methods, and systems provide for configuration of a NR downlink (DL) PRS resource pool, a resource set and a single resource, a NR DL PRS resource element mapping rule, and a design for a DL PRS sequence generator. Certain such embodiments are targeted to configure flexible DL PRS resource pool allocation that is capable to support positioning services with high accuracy coordinate estimation in NR systems. Multilevel resource configuration provides a flexible measurement reporting structure, which optimizes the DL-based positioning operation. Disclosed embodiments of resource element mapping along with scheduling procedure and sequence generation are configured to improve or optimize receiver complexity for PRS detection and for coarse/fine positioning estimation.

Certain embodiments include design options for configuration of NR DL PRS, provide mechanisms for DL PRS pool, provide resource set and resource configuration, provide design for DL PRS sequence generation, provide multiplexing mechanisms of DL PRS transmission with other DL transmissions, and/or provide details of quasi-colocation (QCL) assumption on DL PRS and scheduling aspect for DL positioning in NR system.

NR DL PRS Design Aspects

Resource Allocation

Figure 1:
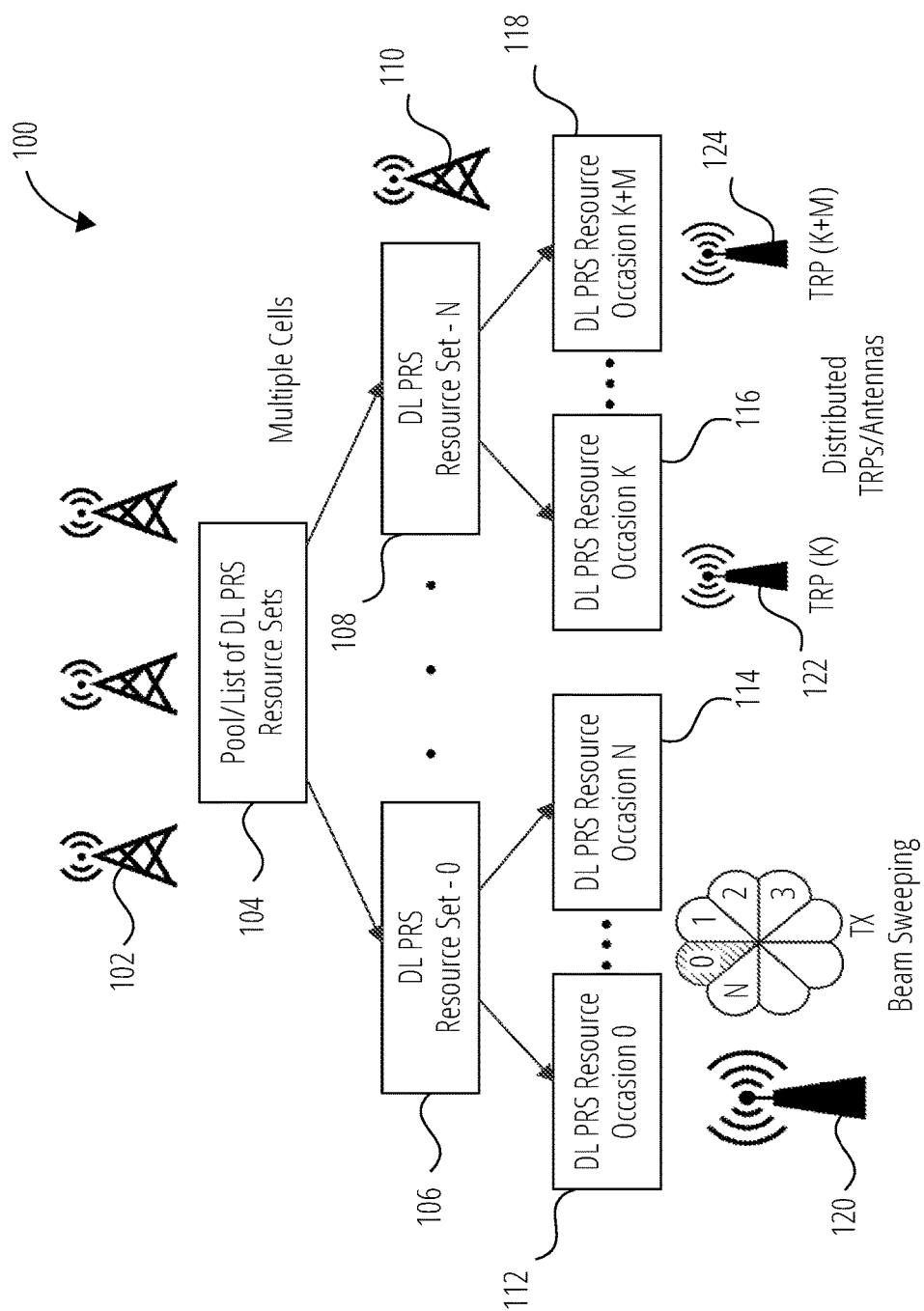
FIG. 1 illustrates an example structure in accordance with one embodiment.

In certain embodiments, an overall resource allocation for DL PRS may be structured in a DL PRS resource, a DL PRS resource set, and a pool of DL PRS resource sets. For example, FIG. 1 illustrates an example structure 100 for configuration of DL PRS transmissions according to one embodiment. The example structure 100 includes a plurality of gNBs 102 (three shown) that may correspond to multiple cells, a DL PRS resource pool 104 or list of DL PRS resource sets for the plurality of gNBs 102, and a plurality of DL PRS resource sets including a DL PRS resource set 106 (shown as DL PRS resource set 0) and a DL PRS resource set 108 (shown as DL PRS resource set N) dedicated to one or more gNB 110 of the plurality of gNBs 102.

As discussed below, DL PRS resource set 0, . . . , DL PRS resource set N are each a combination of DL PRS resources that may be used for respective DL PRS resource occasions for transmission reception points (TRPs)/antennas. As shown in FIG. 1, for example, the DL PRS resource set 106 (DL PRS resource set 0) may be used for DL PRS resource occasion 112 (shown as DL PRS resource occasion 0), . . . , DL PRS resource occasion 114 (shown as DL PRS resource occasion N) to assist a TRP 120 with DL transmission (TX) beam sweeping (e.g., illustrated by TX beams 1, 2, 3, . . . , N). Similarly, the DL PRS resource set 108 (DL PRS resource set N) may be used for DL PRS resource occasion 116 (shown as DL PRS resource occasion K), . . . , DL PRS resource occasion 118 (shown as DL PRS resource occasion K+M). In this example, the DL PRS resource occasion K may be used to support a TRP 122 (shown as TRP (K)) and the DL PRS resource occasion K+M may be used to support TRP 124 (shown as TRP (K+M)).

The example structure 100 provides flexibility to describe PRS transmission settings in various deployment scenarios including support of beamforming, distributed antennas, support of neighboring cells, etc. The example structure 100 may be somewhat similar to CSI-RS configuration, which is further extended herein and enhanced to introduce DL PRS specific components.

DL PRS Resource Pool

Figure 2:
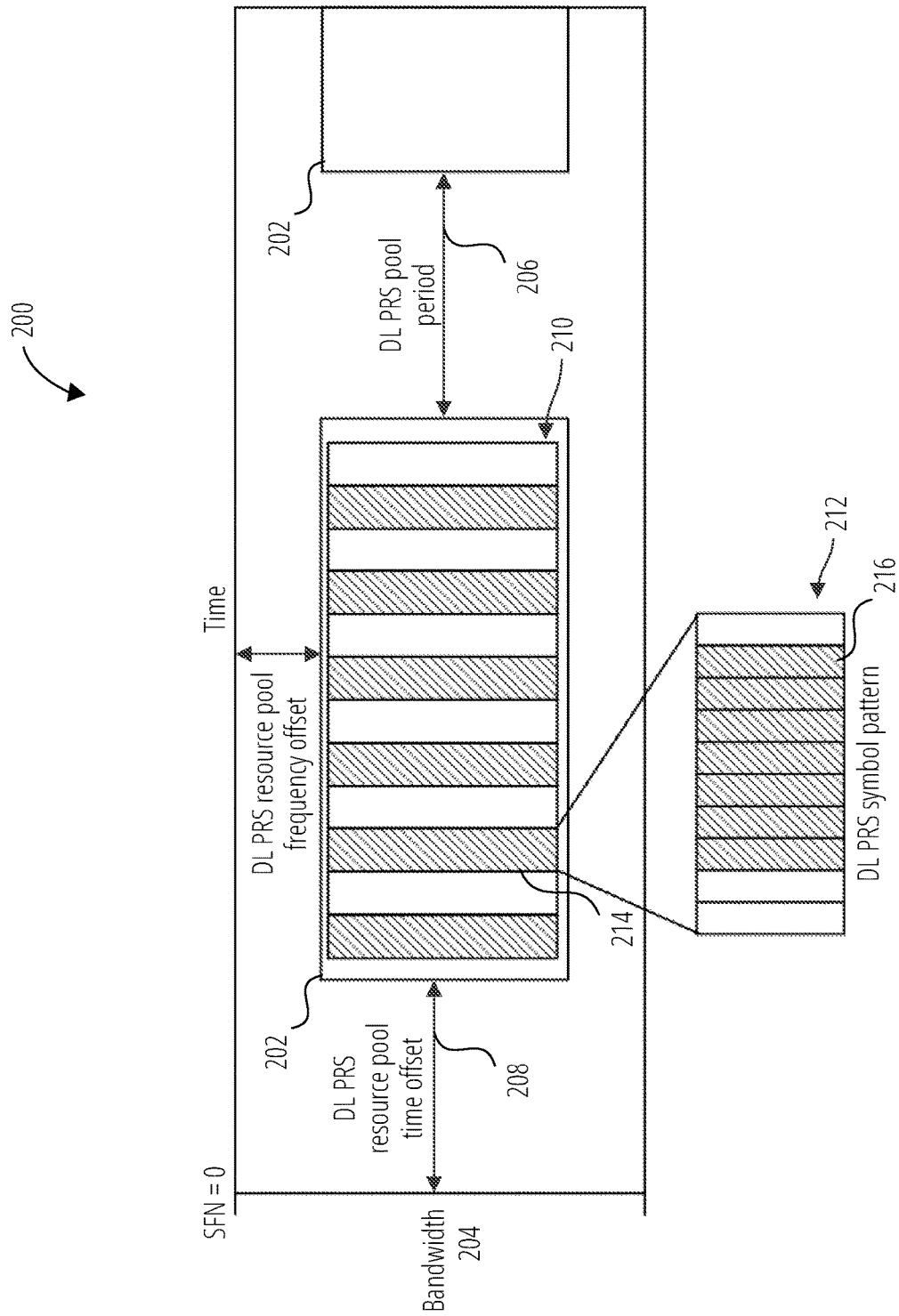
FIG. 2 illustrates a DL PRS pool structure in accordance with one embodiment.

FIG. 2 illustrates a DL PRS pool structure 200 that may be used for the DL PRS resource pool 104 according to one embodiment. The DL PRS resource pool 104 is a periodically repeated amount of resources 202 in the system dedicated for DL PRS transmission by the plurality of gNBs 102. As shown in FIG. 2, a configuration of the DL PRS resource pool 104 may include one or a combination of attributes including a pool identifier (ID) and a DL PRS pool bandwidth 204, a DL PRS pool periodicity and time offset (represented by DL PRS pool period 206 and DL PRS resource pool time offset 208), a DL PRS pool slot pattern 210, and a DL PRS pool symbol pattern 212.

One or a combination of options may be used for indication of the bandwidths used for DL PRS pool bandwidth 204. In one embodiment, for example, the indication may include a start and end physical resource block (PRB) for a PRS resource pool with respect to a reference point (e.g., reference point A). As another example embodiment, the indication may include a PRB offset with respect to a reference point (e.g., reference point A) and a number of allocated PRBs for the DL PRS resource pool. In yet another example embodiment, the indication may include a PRB allocation pattern defined as a bitmap with respect to a reference point (e.g., reference point A).

The DL PRS resource pool configuration may define a DL PRS pool periodicity and time offset. The periodicity (represented by DL PRS pool period 206) defines the amount of time between resources 202 of two consecutive DL PRS pools. The periodicity offset (represented by DL PRS resource pool time offset 208) may be defined in slots with respect to system frame number (SFN)=0.

The DL PRS resource pool configuration may define a DL PRS pool slot pattern 210 that indicates which slots are configured for DL PRS transmission on a given DL PRS resource. In FIG. 2, for example, the shaded slots (such as slot 214) are configured for DL PRS transmission. The slot pattern may be used to allocate non-consecutive slots for DL PRS transmission. The slot pattern may be defined with respect to the slot indicated by, for example, the periodicity and offset.

The DL PRS resource pool configuration may also define a DL PRS pool symbol pattern 212 that indicates which symbols inside the slot are configured for DL PRS transmission on a given DL PRS resource. In FIG. 2, for example, the shaded symbols (such as symbol 216) are configured for DL PRS transmission.

In certain embodiments, a DL PRS pool structure 200 as shown in FIG. 2 may not be separately defined. In such embodiments, shown in FIG. 2 and discussed above may be part of the DL PRS resource set and/or DL PRS resource configuration, which are described below.

DL PRS Resource Set

The DL PRS resource pool 104 may be divided into DL PRS resource sets (shown as DL PRS resource set 106, . . . , DL PRS resource set 108 in FIG. 1), which may be dedicated to one or more gNB 110. The aggregation of the DL PRS resource pool 104 from resource sets is convenient from the perspective of localized in time transmission of the DL PRS signals. DL PRS resource sets may have one or a combination of the following attributes: a cell ID that indicates to which cell the configured DL PRS resource set belongs to; a resource set ID that identifies the configured DL PRS resource set; a list of DL PRS resource IDs to indicate DL PRS resources corresponding to a given DL PRS resource set; a resource set type to indicate whether the resource set is periodic or semi-persistent (note that an aperiodic type can be supported by semi-persistent with only one resource configured, if it is supported); an same TX antenna port(s) (repetition) field to indicate whether the same spatial TX filter is applied across DL PRS resources within a set, which may be used for receive (RX) antenna training; and/or a muting bitmap for activation/deactivation of DL PRS transmission occasions to indicate whether a given DL PRS transmission occasion is used for DL PRS transmission or not.

DL PRS Resource

DL PRS resource set may be a combination of DL PRS resources. Each resource indicates time-frequency resources for transmission of DL PRS from a given transmission point with a fixed spatial filter. Thus, the resource set can support beamforming at a gNB/TRP (e.g., different spatial filters in frequency range 2 (FR2)) or include a set resources for geographically distributed cells (e.g., TRPs/gNBs). DL PRS resources may have one or a combination of the following attributes: a resource element mapping pattern (e.g., see FIG. 3) that defines a resource element mapping pattern for each symbol of a DL PRS resource, wherein each mapping pattern may include a unique number of occupied symbols; a frequency shift that points to the frequency shift of a defined DL PRS resource element mapping pattern; a TX beam ID that indicates the transmission beam used for DL PRS transmission; a number of ports field that indicates a number of antenna ports per DL PRS resource (e.g., 1 or 2), a unique resource ID; an offset in time field that points to the first orthogonal frequency division multiplexing (OFDM)

symbol where a DL PRS resource starts within a DL PRS pool; a resource duration to indicate a duration of a single DL PRS resource (note that the notion of occasions may be used to apply various DL PRS transmission schedules including DL PRS muting patterns across occasions, e.g., $N_{PRS\_RES}$ consecutive patterns for NR DL PRS transmission ($N_{PRS\_RES} \geq 1$), where $N_{PRS\_RES}$ may be a common parameter across DL PRS resources or DL PRS resource sets); a sequence ID used to generate pseudo-random DL PRS sequence(s); and/or quasi-collocation information (e.g., transmission configuration indicator (TCI) state ID) that indicates whether a given DL PRS signal resource is quasi-collocated with any reference signals.

Resource Element Mapping Pattern

Figure 3:
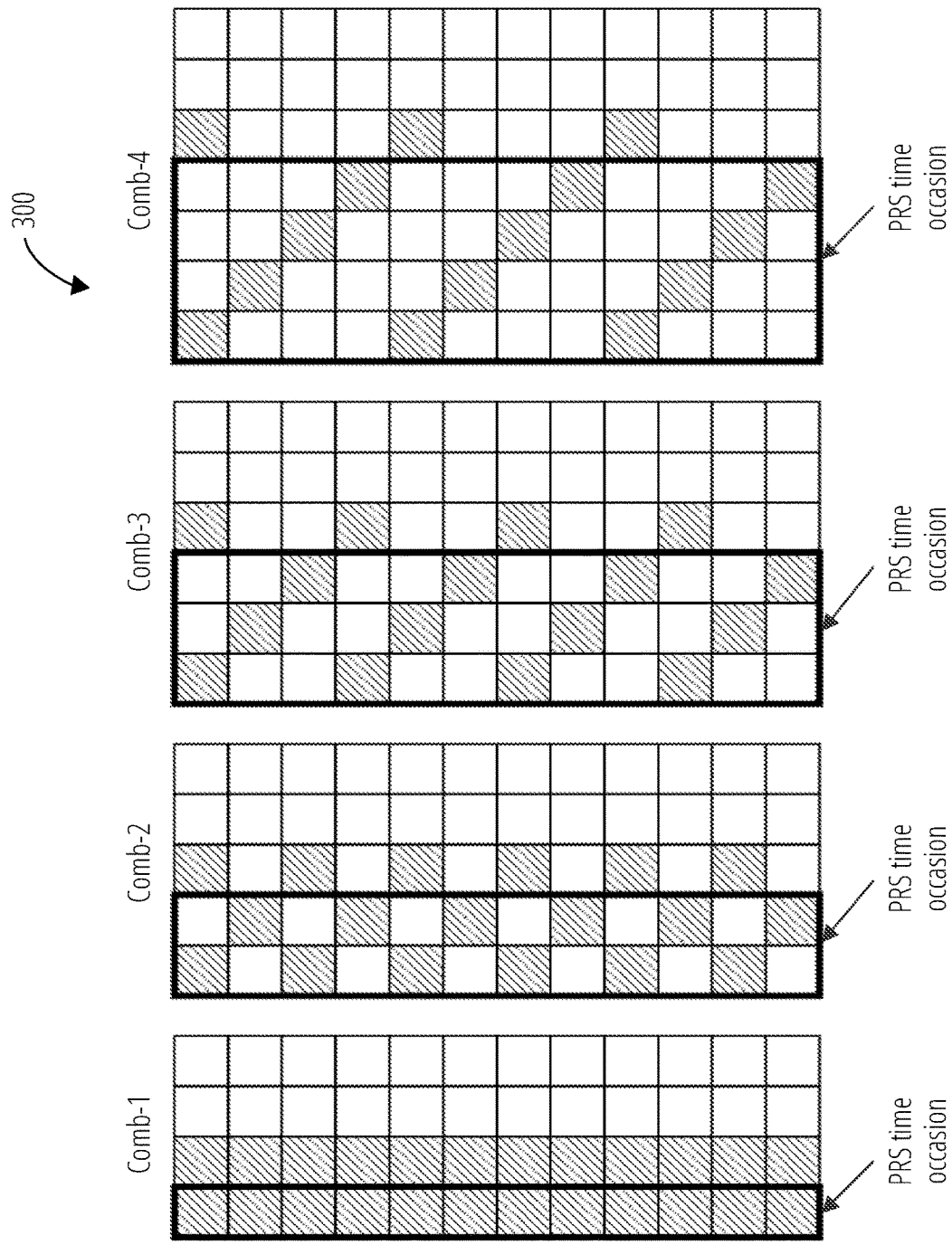
FIG. 3 illustrates a PRB mapping pattern of DL PRS mapping in accordance with one embodiment.

FIG. 3 illustrates a PRB mapping pattern 300 of DL PRS mapping according to one embodiment. The resource element pattern supports a comb-$N_{comb}$ structure in frequency for DL PRS, where $N_{comb}=\{1, 2, 3, 4\}$. Time occupation in a single DL PRS resource occupation consists of $N_{PRS\_OCC} \cdot N_{comb}$ consecutive symbols. FIG. 3 depicts suitable sets of comb-N patterns. However, skilled persons will recognize from the disclosure herein that other sets of comb-N patterns may also be used.

Figure 4:
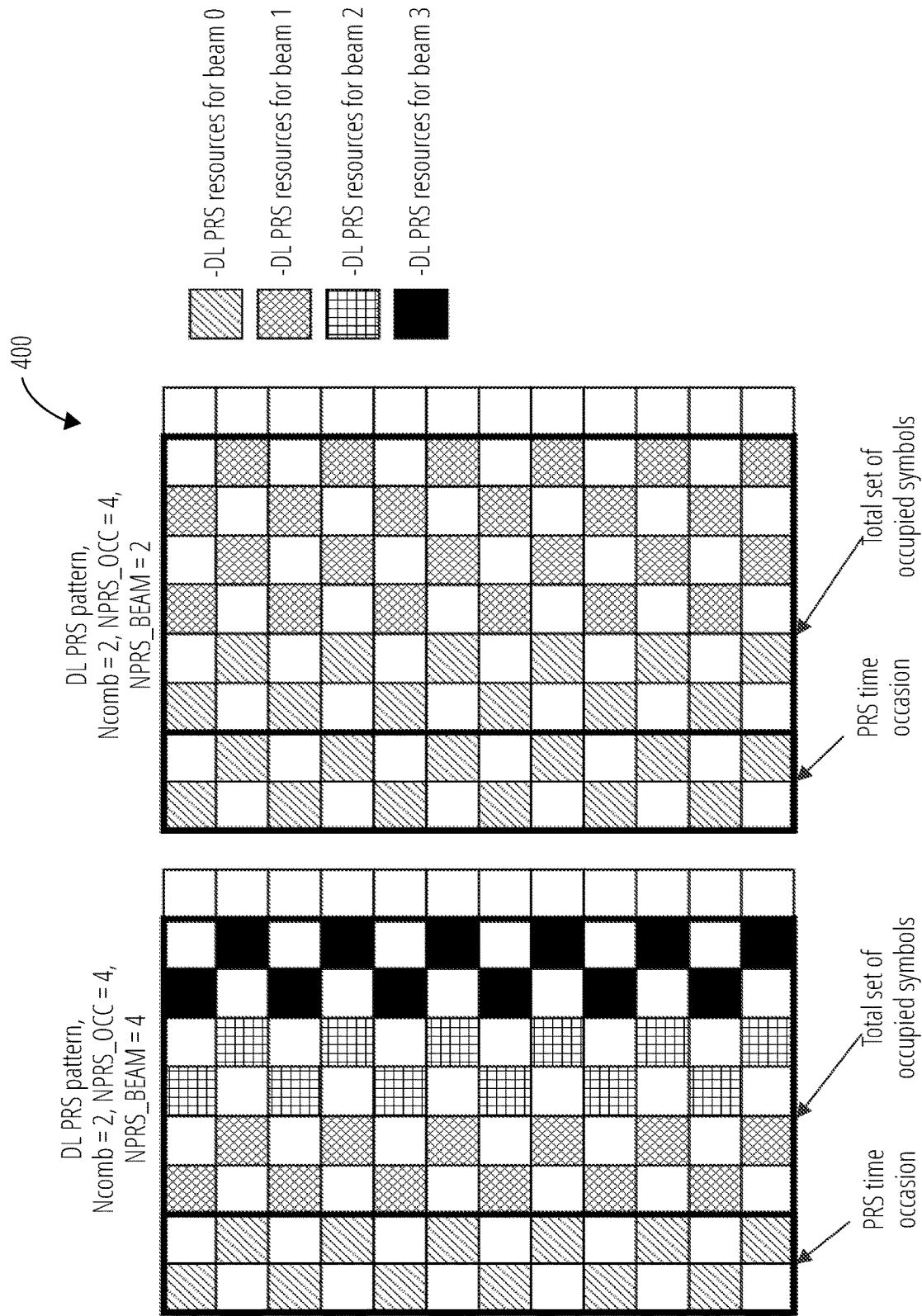
FIG. 4 illustrates a DL PRS mapping pattern in accordance with one embodiment.

In certain embodiments, the number used beams for DL PRS signal transmission is defined in the system as $N_{PRS\_BEAM}$. Each beam may be assigned with unique DL PRS resource, and the total number of occupied time symbols equals to $N_{comb} \cdot N_{PRS\_OCC} \cdot N_{PRS\_BEAM}$. For each DL PRS resource the transmission beam is defined. FIG. 4 illustrates an example DL PRS mapping pattern 400 with 2 and 4 beams.

Figure 5:
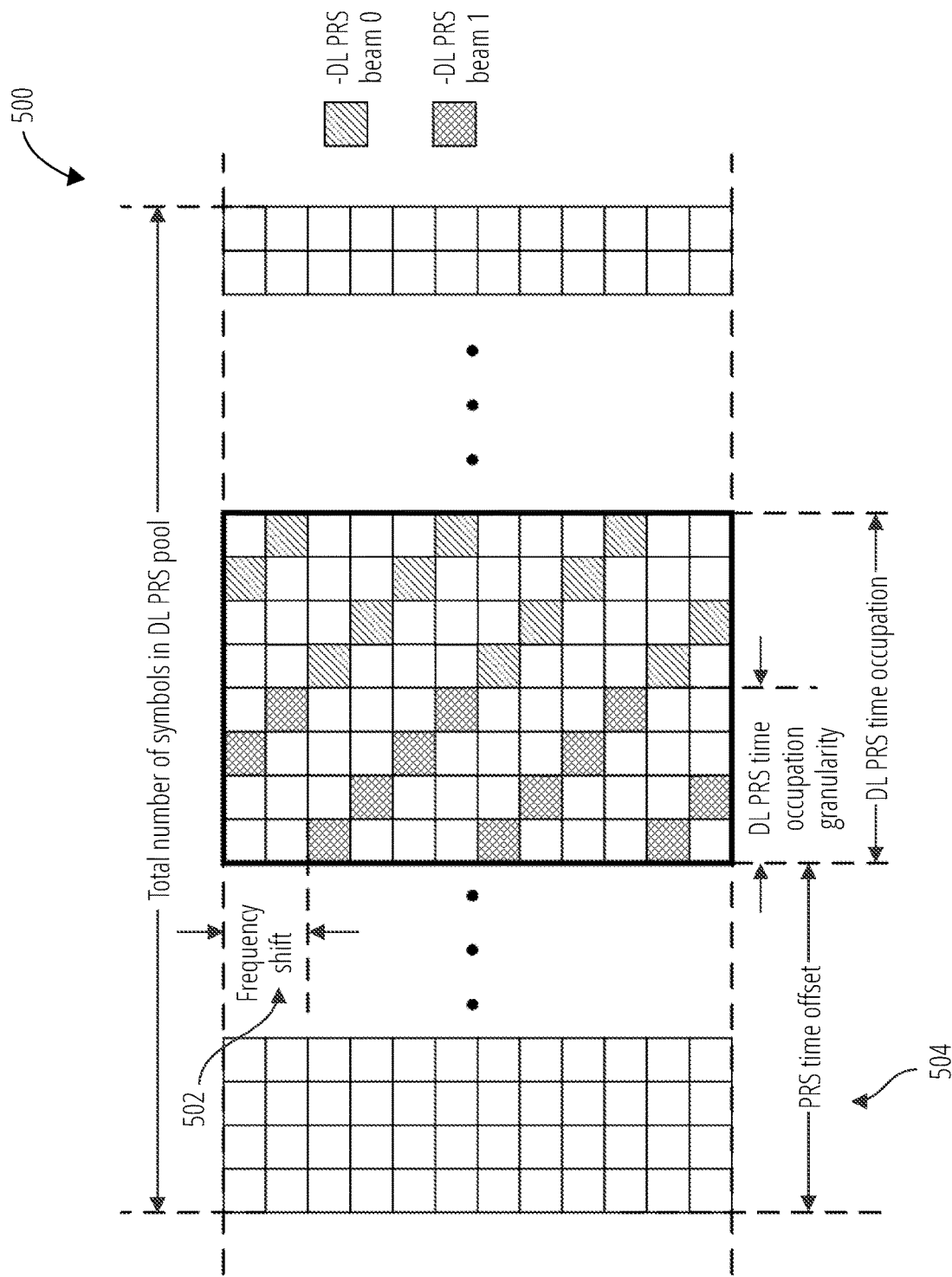
FIG. 5 illustrates a DL PRS mapping pattern determination in accordance with one embodiment.

FIG. 5 illustrates an example of a DL PRS mapping pattern determination 500 or configuration, where certain embodiments define following parameters: system-specific parameters that were described above ($N_{PRS\_RES}$, $N_{comb}$, $N_{PRS\_BEAM}$); gNB-specific parameters such as $N_{PRS\_ID}$ (a parameter described above that can be used for pattern selection as well) and A which can enable a pseudo random resource selection procedure for a gNB; a frequency shift 502 for comb frequency pattern; a PRS time offset 504; a randomization parameter; and/or a transmission beam ID.

The frequency shift 502 frequency shift for comb frequency pattern may depend on one or a combination of following parameters: $N_{PRS\_ID}$, $N_{comb}$, $\Delta$. As an example, following formula can be used for frequency shift calculation:

frequency shift=$(N_{PRS\_ID}+\Delta)$ mod $N_{comb}$.

The time offset 504 for the first PRS resource from a PRS resource set inside a PRS pool may depend on one or a combination of following parameters: $N_{PRS\_ID}$, $N_{comb}$, $\Delta$, $N_{PRS\_RES}$, and $N_{PRS\_SET\_NUM}$ (total number of DL PRS resource sets inside of the DL PRS resource pool). As an example, the following formula can be used for time shift calculation:

$$\text{time offset} = \left(\left\lfloor \frac{N_{PRS\_ID} + \Delta}{N_{comb}} \right\rfloor \mod N_{PRS\_SET\_NUM}\right) \cdot N_{PRS\_RES}.$$

The randomization parameter can be calculated according to following formula, which depends on one or a combination of following parameters: SFN, $N_{POOL\_PERIOD}$ (predefined PRS pool period), $\Delta_{PRS\_init}$ (gNB-specific parameter initial delta value), and $\Delta_{PRS\_init}=\{0, 1, \ldots N_{comb} \cdot N_{PRS\_POOL}\}$. As an example, following formula can be used for randomization parameter calculation:

$$\Delta = \begin{cases} 0, & \text{randomization off} \\ (\Delta_{PRS\_init} + \lfloor SFN/N_{POOL\_PERIOD} \rfloor) \mod (N_{POOL\_PERIOD}), & \text{randomization on} \end{cases}.$$

The transmission beam ID for a current DL PRS resource, which depends on one or a combination of following parameters: $N_{comb}$, $\Delta$, $N_{PRS\_BEAM}$, and $N_{PRS\_res\_id}$ (DL PRS resource ID), the following formula can be used as an example for Tx beam ID calculation:

$$Tx\,\text{beam}\,Id = \left\lfloor \frac{(N_{PRS\_res\_id} + \Delta)N_{comb}}{N_{PRS\_BEAM}} \right\rfloor.$$

Number of DL PRS Antenna Ports

In certain wireless system implementations, a single port DL PRS physical structure may be supported. Certain embodiments disclosed herein, however, support two antenna ports for DL PRS. Adding one more port does not necessarily imply more spectrum resources needed and does not add much complexity to the RX processing. However, adding an additional port may benefit performance due to TX diversity support. In particular, two port transmission can improve timing estimation accuracy Coexistence with Legacy UEs/DL PRS Transmission In certain wireless system implementations (e.g., 3GPP Rel. 15), mechanisms of forward compatibility have been developed, e.g., RateMatchPattern for PDSCH, etc. This mechanism indicates resources slots and symbol and PRBs, where a UE is expected to do rate-matching. By configuring proper RateMatchPattern(s) to Rel. 15 UEs, according to certain embodiments, it is possible to avoid conflict with DL PRS transmission. Another embodiment allocates DL PRS transmissions in slots where other DL transmission are avoided (not configured).

NR DL PRS Sequence Design

Certain embodiments provide a sequence generation procedure for DL PRS signals.

Figure 6:
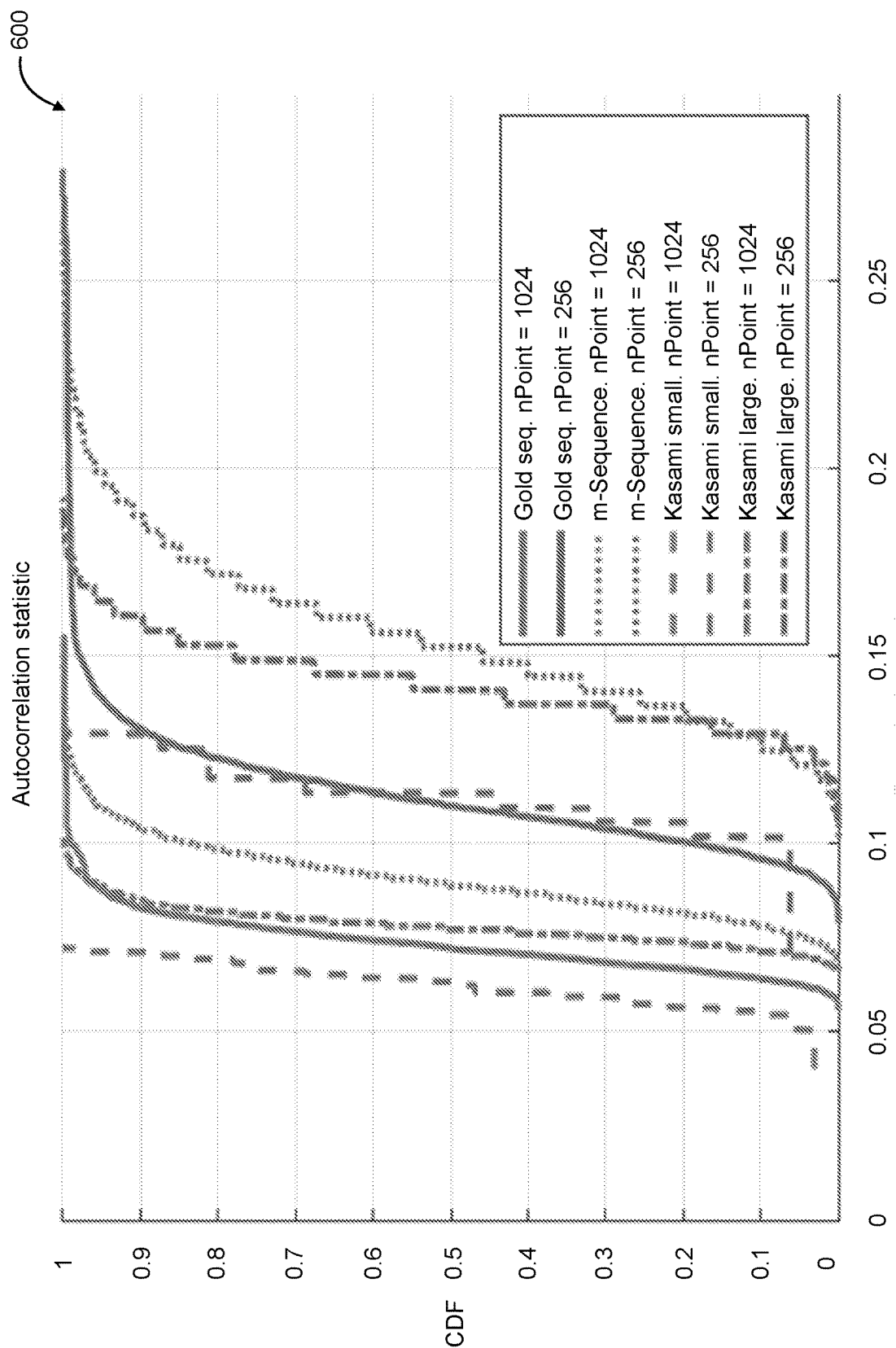
FIG. 6 illustrates an autocorrelation statistic in accordance with one embodiment.
Figure 7:
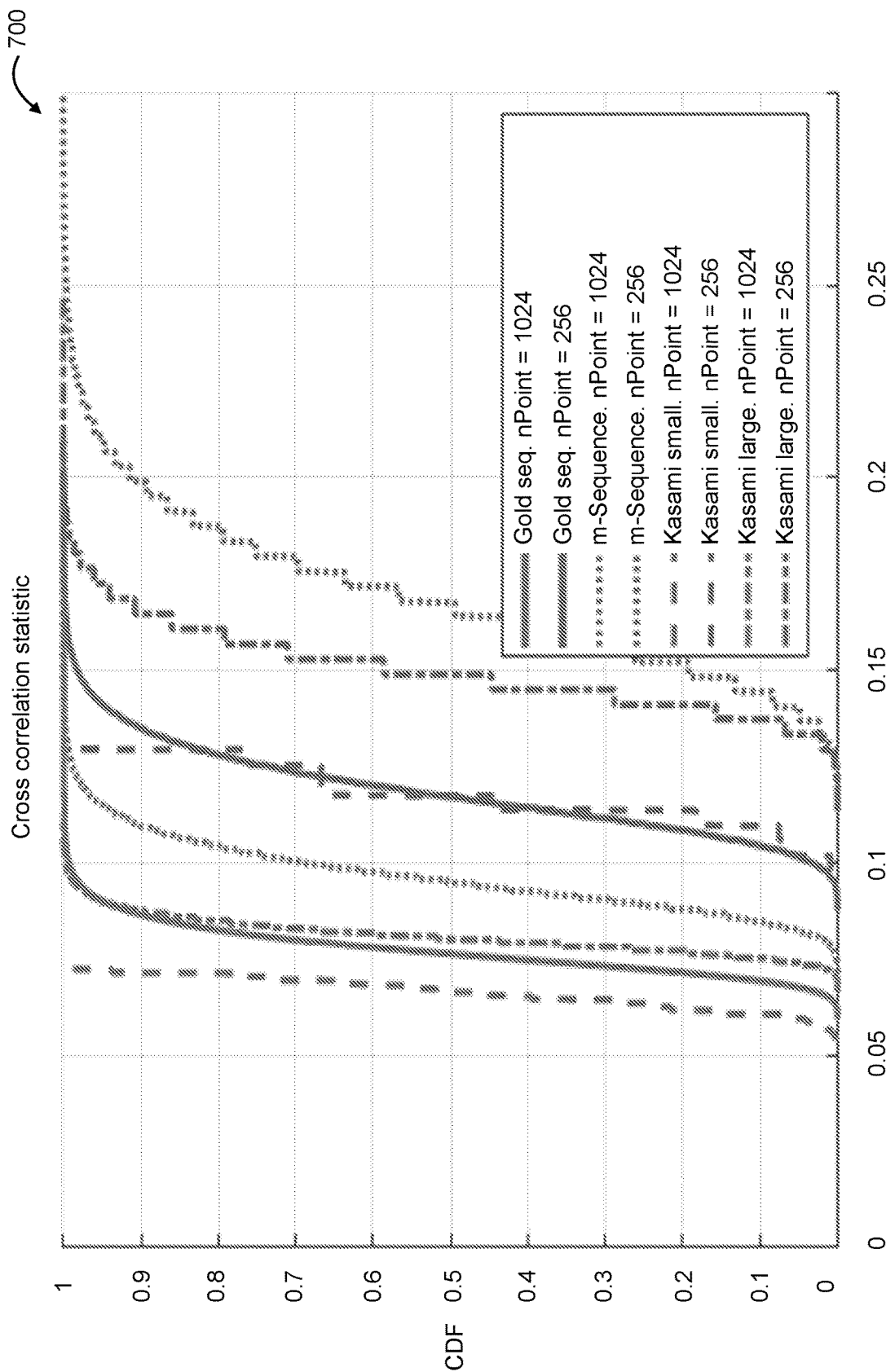
FIG. 7 illustrates a cross correlation statistic in accordance with one embodiment.

According to provided statistics (see FIG. 6 and FIG. 7), it is suggested to reuse the pseudo-random sequence generator from section 5.2.1 in 3GPP TS 38.211, V15.4.0 for DL PRS sequence generation procedure. FIG. 6 illustrates example graphs for autocorrelation statistic 600 and FIG. 7 illustrates example graphs for cross correlation statistic 700. Thus, a DL PRS signal for each slot index $n_s^\mu$ and symbol index inside of the slot 1 may have following form:

$$r_{l,n_s}^p(m) = \frac{1}{\sqrt{2}}(1 - 2 \cdot c(2m)) + j\frac{1}{\sqrt{2}}(1 - 2 \cdot c(2m)),$$

$$m = 0, 1, \ldots 2N_{RB}^{max,DL} - 1,$$

where the initialization seed for the generation $c_{init}$ is defined by the equation which depends on one or a combination of following parameters: $N_{PRS\_ID}$ (a special configuration parameter for DL positioning operation, $N_{PRS\_ID} \in \{1 \ldots$ 4095} equals $N_{ID}^{cell}$ unless configured by higher layers. Δ is a parameter that can enable a pseudo random sequence selection procedure for a gNB, if it required. The parameter $n_s^\mu$ is a slot number (slot index) within a subframe for subcarrier spacing configuration μ. The parameter 1 is a symbol counter inside of the slot.

As an example of the equation, the following formula can be used:

$$c_{init} = 2^{28} \cdot \left\lfloor \frac{N_{PRS_{ID}} + \Delta}{512} \right\rfloor + 2^{10} \cdot (14(n_s^\mu + 1) + l + 1) \cdot$$
$$(2 \cdot ((N_{PRS_{ID}}, +\Delta) \bmod 512) + 1) + (N_{PRS_{ID}} + \Delta) \bmod 512.$$

DL PRS Multiplexing with DL Transmissions

Various options may be used or combined multiplexing of DL PRS and DL transmissions. In one embodiment, for example, time division multiplexing (TDM) transmission of DL PRS signals with other DL signals/channels may be preferred in both 3GPP frequency range 1 (FR1) and FR2. This may help to avoid dynamic range and in-channel selectivity issues at the UE side leading to more predictable performance and accurate measurements. While certain implementations may use allocation of dedicated resources for DL PRS transmission, it may be beneficial to further clarify that the DL PRS transmissions are TDM with other DL signals/channels. In another embodiments, frequency division multiplexing (FDM) transmission of DL PRS with other DL signals/channels is not preferred in both FR1 and FR2, and may be precluded at least for FR2. The FDM of DL-PRS with other signals may negatively affect the UE dynamic range and lead to unpredictable results, considering wideband beam management DL PRS Relationship with DL BWPs In certain embodiments, NR DL PRS configuration is not be restricted by DL bandwidth parts (BWPs) configured to UE. At the same time, from a specification perspective, it may be easier to associate one of the DL BWPs with NR DL PRS ("positioning DL BWP") and configure it to UE. This approach does not impose any constraints on DL PRS configuration. From a UE perspective, it may imply processing of DL PRS signals only within "positioning DL BWP". One of the configured DL BWPs (associated with PRS) may, in certain embodiments, be always aligned with NR DL PRS configuration parameters. If UE DL PRS processing bandwidth is less than the bandwidth of the configured DL PRS, a gNB may configure the "positioning" DL BWP according to the UE processing capabilities.

To process DL PRS, a UE (interested in positioning) may need to switch between active DL BWP and "positioning" DL BWP, if necessary. The UE does may not need to switch, if "positioning" DL BWP is allocated within active DL BWP. Assumptions of DL BWP switching are reused for DL PRS processing.

DL PRS Quasi-Collocation Aspects

DL PRS from a serving cell may be associated by quasi-collocation with other reference signals (e.g. NR Rel.15/16). For that purpose, according to certain embodiments, quasi-collocation signaling may be used. One or a combination of following options of DL PRS QCL are applied if applicable: DL PRS resource(s) within DL PRS resource set is configured as quasi-collocated with each other using QCL Type-A; DL PRS resource(s) within DL PRS resource set is configured as quasi-collocated with CSI-RS for tracking (e.g., tracking reference signal (TRS)) using QCL Type-A and/or QCL Type-D; DL PRS resource (s) within DL PRS resource set is configured as quasi-collocated with CSI-RS for beam management (BM) using QCL Type-D; and/or DL PRS resource(s) within DL PRS resource set is configured as quasi-collocated with synchronization signal block (SSB) (e.g., SSB index) using QCL Type-C and/or Type-D.

DL PRS Transmission Schedule

In certain embodiments, transmission on dedicated NR DL PRS resources supports DL TX beam sweeping and on/off of DL PRS transmission on allocated DL PRS resources. This functionality is useful to enable accurate measurement of signal location parameters for as many TRPs as possible in interference limited scenarios. To enable on/off operation, the notion of occasion was introduced inside of DL PRS resource, where occasion determines consecutive number of symbols (overall resource is represented by multiple occasions).

Embodiments may include two types of deployment scenarios: 1) enhanced positioning area, and 2) basic deployments (non-optimized from positioning perspective). In enhanced positioning areas, proper amount of spectrum resources as well as optimized PRS transmission schedule can be configured to UEs. In basic deployments, the randomized transmission on DL PRS resource should be supported to improve positioning performance. Therefore, in terms of PRS transmission at least two modes of operation should be supported by NR.

For NR positioning, several types of randomization are possible and supported. One or a combination of following options may be used according to certain embodiments: spatial randomization (beam(s) for DL PRS transmission are randomly assigned); time randomization (time resource(s) for DL PRS transmission are randomly assigned); frequency randomization (frequency resource(s) for DL PRS transmission are randomly assigned); and/or code randomization (sequence(s) for DL PRS transmission are randomly assigned).

In certain embodiments, at least two modes of DL PRS transmission are supported by NR: PRS Transmission Mode 1 and PRS Transmission Mode 2. PRS Transmission Mode 1 is based on a predefined PRS transmission schedule (PTM1) and a PRS transmission pattern on a given PRS Resource is signaled to the UE (e.g. pre-configured).

Figure 8:
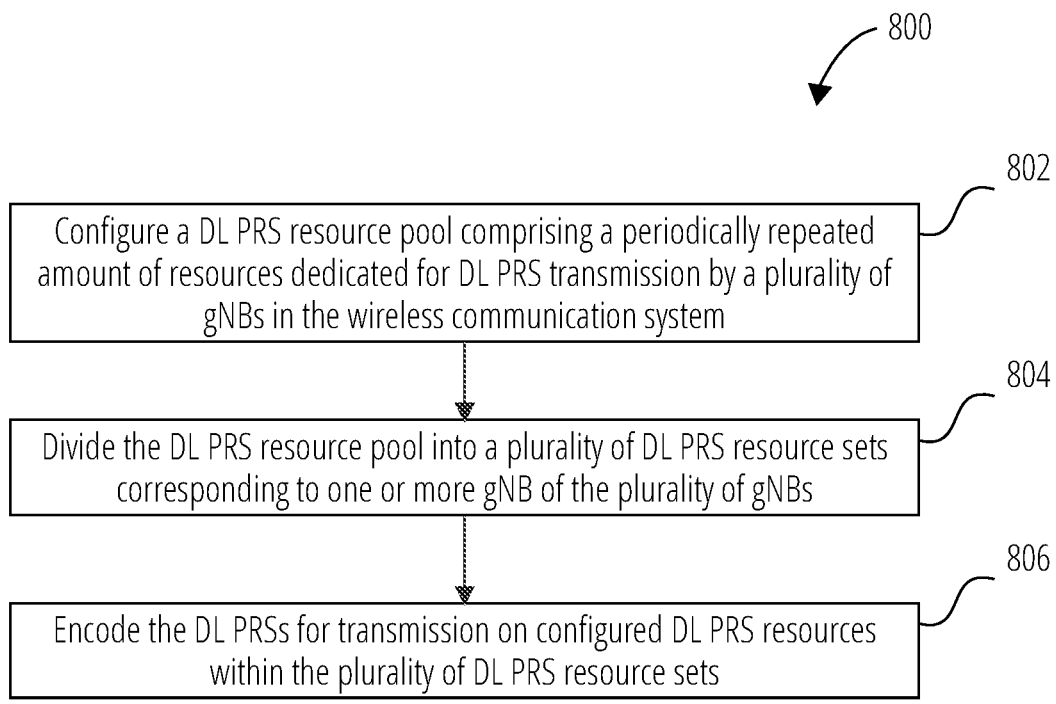
FIG. 8 illustrates a method for transmitting DLPRSs in a wireless system in accordance with one embodiment.

PRS Transmission Mode 2 is based on a pseudo-random PRS transmission schedule (PTM2). In PRS Transmission Mode 2, PRS transmission on a given PRS Resource is controlled probabilistically (e.g., according to (pre-)configured probability of PRS transmission PPRS_TX). In addition, or in other embodiments, space (beam), time, frequency, and code randomization techniques are applied for DL PRS transmission on dedicated resources FIG. 8 is a flowchart of a method 800 for transmitting DL PRS in a wireless system according to one embodiment. In block 802, the method 800 configures a DL PRS resource pool comprising a periodically repeated amount of resources dedicated for DL PRS transmission by a plurality of gNBs in the wireless communication system. In block 804, the method 800 divides the DL PRS resource pool into a plurality of DL PRS resource sets corresponding to one or more gNB of the plurality of the gNBs. In block 806, the method 800 encodes the DL PRSs for transmission on configured DL PRS resources within the plurality of DL PRS resource sets.

In certain such embodiments, configuring the DL PRS resource pool comprises configuring one or more parameters including a unique DL PRS pool ID), a DL PRS pool bandwidth, a DL PRS pool periodicity defining an amount of time between two consecutive DL PRS pools, and a DL PRS pool time offset. The DL PRS pool time offset may be defined in slots with respect to a predetermined SFN.

In certain embodiments, configuring the DL PRS resource pool comprises configuring a DL PRS pool slot pattern to indicate which slots are configured for DL PRS transmission on a given DL PRS resource. Configuring the DL PRS pool slot pattern may include formatting a bitmap pattern indicating each PRS allocated slot inside of the DL PRS resource pool.

In certain embodiments, configuring the DL PRS resource pool includes configuring a DL PRS pool symbol pattern to indicate which symbols inside a slot are configured for DL PRS transmission on a given DL PRS resource. Configuring the DL PRS pool symbol pattern may include formatting a bitmap pattern indicating each allocated symbol inside of each slot available for DL PRS transmission.

Figure 9:
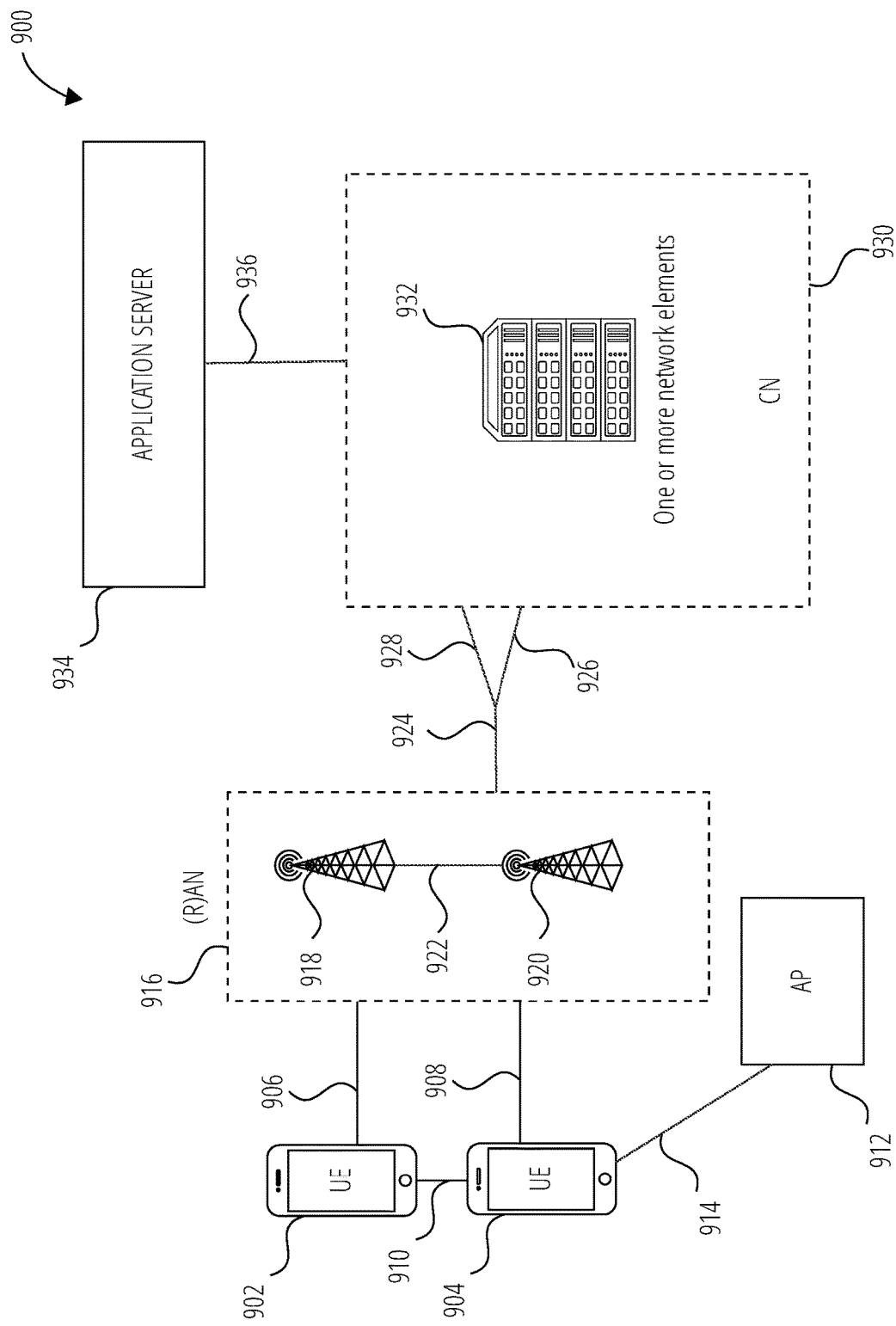
FIG. 9 illustrates a system in accordance with one embodiment.

FIG. 9 illustrates an example architecture of a system 900 of a network, in accordance with various embodiments. The following description is provided for an example system 900 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 9, the system 900 includes UE 902 and UE 904. In this example, the UE 902 and the UE 904 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 902 and/or the UE 904 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 902 and UE 904 may be configured to connect, for example, communicatively couple, with an access node or radio access node (shown as (R)AN 916).

In embodiments, the (R)AN 916 may be an NG RAN or a 5G RAN, an E-UTRAN, or a legacy RAN, such as a UTRAN or GERAN. As used herein, the term "NG RAN" or the like may refer to a (R)AN 916 that operates in an NR or 5G system, and the term "E-UTRAN" or the like may refer to a (R)AN 916 that operates in an LTE or 4G system. The UE 902 and UE 904 utilize connections (or channels) (shown as connection 906 and connection 908, respectively), each of which comprises a physical communications interface or layer (discussed in further detail below).

In this example, the connection 906 and connection 908 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UE 902 and UE 904 may directly exchange communication data via a ProSe interface 910. The ProSe interface 910 may alternatively be referred to as a sidelink (SL) interface and may comprise one or more logical channels, including but not limited to a PSCCH, a PSSCH, a PSDCH, and a PSBCH.

The UE 904 is shown to be configured to access an AP 912 (also referred to as "WLAN node," "WLAN," "WLAN Termination," "WT" or the like) via connection 914. The connection 914 can comprise a local wireless connection, such as a connection consistent with any IEEE 802.11 protocol, wherein the AP 912 would comprise a wireless fidelity (Wi-Fi®) router. In this example, the AP 912 may be connected to the Internet without connecting to the core network of the wireless system (described in further detail below). In various embodiments, the UE 904, (R)AN 916, and AP 912 may be configured to utilize LWA operation and/or LWIP operation. The LWA operation may involve the UE 904 in RRC_CONNECTED being configured by the RAN node 918 or the RAN node 920 to utilize radio resources of LTE and WLAN. LWIP operation may involve the UE 904 using WLAN radio resources (e.g., connection 914) via IPsec protocol tunneling to authenticate and encrypt packets (e.g., IP packets) sent over the connection 914. IPsec tunneling may include encapsulating the entirety of original IP packets and adding a new packet header, thereby protecting the original header of the IP packets.

The (R)AN 916 can include one or more AN nodes, such as RAN node 918 and RAN node 920, that enable the connection 906 and connection 908. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or 5G system (for example, a gNB), and the term "E-UTRAN node" or the like may refer to a RAN node that operates in an LTE or 4G system 900 (e.g., an eNB). According to various embodiments, the RAN node 918 or RAN node 920 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 918 or RAN node 920 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 918 or RAN node 920); a MAC/PHY split wherein RRC, PDCP, RLC, and MAC layers are operated by the CRAN/vBBUP and the PHY layer is operated by individual RAN nodes (e.g., RAN node 918 or RAN node 920); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 918 or RAN node 920 to perform other virtualized applications. In some implementations, an individual RAN node may represent individual gNB-DUs that are connected to a gNB-CU via individual F1 interfaces (not shown by FIG. 9). In these implementations, the gNB-DUs may include one or more remote radio heads or RFEMs, and the gNB-CU may be operated by a server that is located in the (R)AN 916 (not shown) or by a server pool in a similar manner as the CRAN/vBBUP. Additionally, or alternatively, one or more of the RAN node 918 or RAN node 920 may be next generation eNBs (ng-eNBs), which are RAN nodes that provide E-UTRA user plane and control plane protocol terminations toward the UE 902 and UE 904, and are connected to an SGC via an NG interface (discussed infra). In V2X scenarios one or more of the RAN node 918 or RAN node 920 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 918 and/or the RAN node 920 can terminate the air interface protocol and can be the first point of contact for the UE 902 and UE 904. In some embodiments, the RAN node 918 and/or the RAN node 920 can fulfill various logical functions for the (R)AN 916 including, but not limited to, radio network controller (RNC) functions such as radio bearer management, uplink and downlink dynamic radio resource management and data packet scheduling, and mobility management.

In embodiments, the UE 902 and UE 904 can be configured to communicate using OFDM communication signals with each other or with the RAN node 918 and/or the RAN node 920 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 918 and/or the RAN node 920 to the UE 902 and UE 904, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 902 and UE 904 and the RAN node 918 and/or the RAN node 920 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 902 and UE 904 and the RAN node 918 or RAN node 920 may operate using LAA, eLAA, and/or feLAA mechanisms. In these implementations, the UE 902 and UE 904 and the RAN node 918 or RAN node 920 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 902 and UE 904, RAN node 918 or RAN node 920, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 902, AP 912, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 902 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 902 and UE 904. The PDCCH carries information about the transport format and resource allocations related to the PDSCH channel, among other things. It may also inform the UE 902 and UE 904 about the transport format, resource allocation, and HARQ information related to the uplink shared channel. Typically, downlink scheduling (assigning control and shared channel resource blocks to the UE 904 within a cell) may be performed at any of the RAN node 918 or RAN node 920 based on channel quality information fed back from any of the UE 902 and UE 904. The downlink resource assignment information may be sent on the PDCCH used for (e.g., assigned to) each of the UE 902 and UE 904.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 918 or RAN node 920 may be configured to communicate with one another via interface 922. In embodiments where the system 900 is an LTE system (e.g., when CN 930 is an EPC), the interface 922 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 902 from an SeNB for user data; information of PDCP PDUs that were not delivered to a UE 902; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 900 is a SG or NR system (e.g., when CN 930 is an SGC), the interface 922 may be an Xn interface. The Xn interface is defined between two or more RAN nodes (e.g., two or more gNBs and the like) that connect to SGC, between a RAN node 918 (e.g., a gNB) connecting to SGC and an eNB, and/or between two eNBs connecting to 5GC (e.g., CN 930). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 902 in a connected mode (e.g., CM-CONNECTED) including functionality to manage the UE mobility for connected mode between one or more RAN node 918 or RAN node 920. The mobility support may include context transfer from an old (source) serving RAN node 918 to new (target) serving RAN node 920; and control of user plane tunnels between old (source) serving RAN node 918 to new (target) serving RAN node 920. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 916 is shown to be communicatively coupled to a core network-in this embodiment, CN 930. The CN 930 may comprise one or more network elements 932, which are configured to offer various data and telecommunications services to customers/subscribers (e.g., users of UE 902 and UE 904) who are connected to the CN 930 via the (R)AN 916. The components of the CN 930 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 930 may be referred to as a network slice, and a logical instantiation of a portion of the CN 930 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 934 may be an element offering applications that use IP bearer resources with the core network (e.g., UMTS PS domain, LTE PS data services, etc.). The application server 934 can also be configured to support one or more communication services (e.g., VoIP sessions, PTT sessions, group communication sessions, social networking services, etc.) for the UE 902 and UE 904 via the EPC. The application server 934 may communicate with the CN 930 through an IP communications interface 936.

In embodiments, the CN 930 may be an SGC, and the (R)AN 116 may be connected with the CN 930 via an NG interface 924. In embodiments, the NG interface 924 may be split into two parts, an NG user plane (NG-U) interface 926, which carries traffic data between the RAN node 918 or RAN node 920 and a UPF, and the S1 control plane (NG-C) interface 928, which is a signaling interface between the RAN node 918 or RAN node 920 and AMFs.

In embodiments, the CN 930 may be a SG CN, while in other embodiments, the CN 930 may be an EPC). Where CN 930 is an EPC, the (R)AN 116 may be connected with the CN 930 via an S1 interface 924. In embodiments, the S1 interface 924 may be split into two parts, an S1 user plane (S1-U) interface 926, which carries traffic data between the RAN node 918 or RAN node 920 and the S-GW, and the S1-MME interface 928, which is a signaling interface between the RAN node 918 or RAN node 920 and MMEs.

Figure 10:
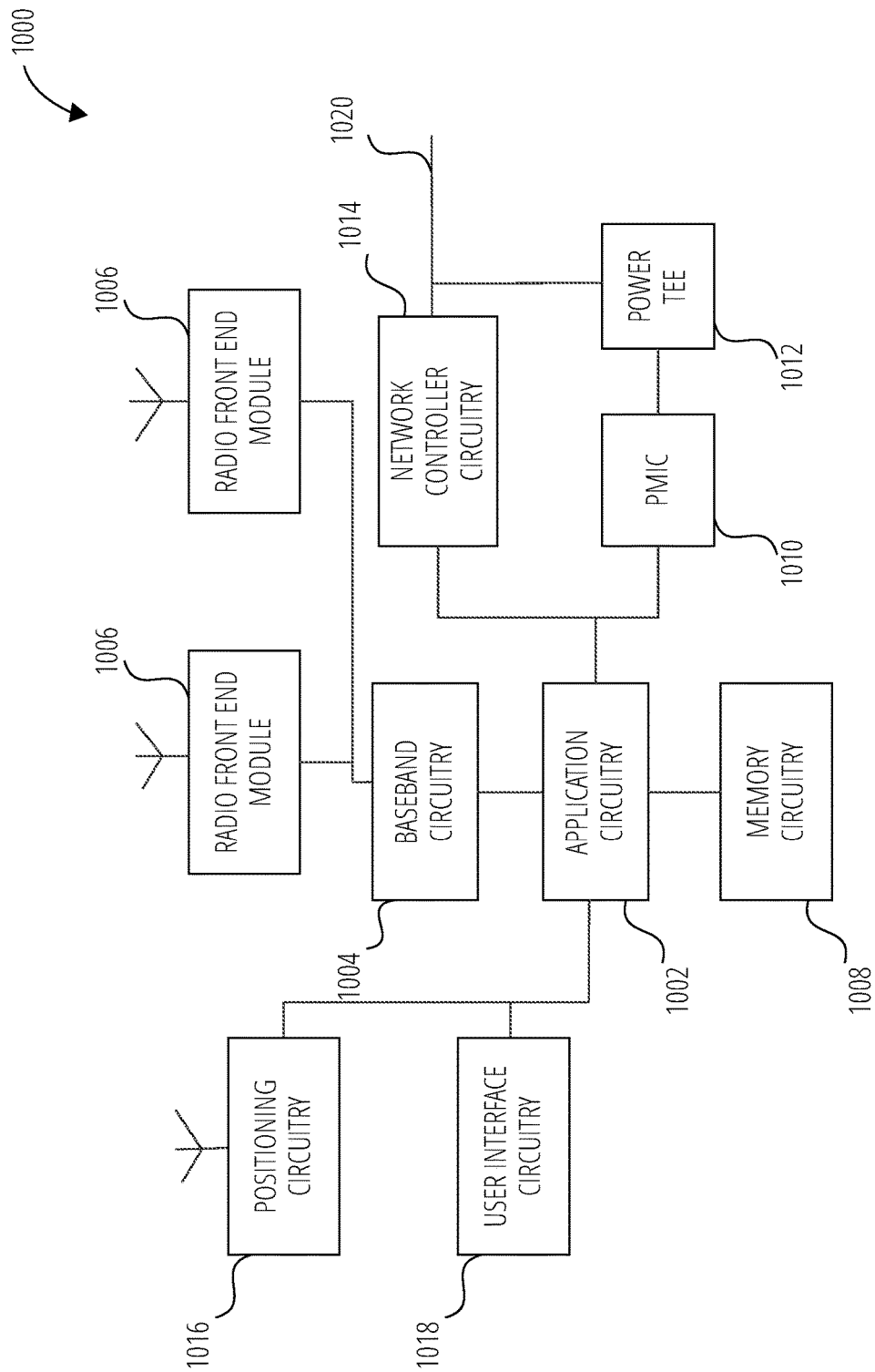
FIG. 10 illustrates an infrastructure equipment in accordance with one embodiment.

FIG. 10 illustrates an example of infrastructure equipment 1000 in accordance with various embodiments. The infrastructure equipment 1000 may be implemented as a base station, radio head, RAN node, AN, application server, and/or any other element/device discussed herein. In other examples, the infrastructure equipment 1000 could be implemented in or by a UE.

The infrastructure equipment 1000 includes application circuitry 1002, baseband circuitry 1004, one or more radio front end module 1006 (RFEM), memory circuitry 1008, power management integrated circuitry (shown as PMIC 1010), power tee circuitry 1012, network controller circuitry 1014, network interface connector 1020, satellite positioning circuitry 1016, and user interface circuitry 1018. In some embodiments, the device infrastructure equipment 1000 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 1002 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1002 may be coupled with or may include memory/storage elements and may be configured to execute instructions stored in the memory/storage to enable various applications or operating systems to run on the infrastructure equipment 1000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1002 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1002 may comprise, or may be, a special-purpose processor/controller to operate according to the various embodiments herein. As examples, the processor(s) of application circuitry 1002 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the infrastructure equipment 1000 may not utilize application circuitry 1002, and instead may include a special-purpose processor/controller to process IP data received from an EPC or 5GC, for example.

In some implementations, the application circuitry 1002 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1002 may comprise logic blocks or logic fabric, and other interconnected resources that may be programmed to perform various functions, such as the procedures, methods, functions, etc. of the various embodiments discussed herein. In such embodiments, the circuitry of application circuitry 1002 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like. The baseband circuitry 1004 may be implemented, for example, as a solder-down substrate including one or more integrated circuits, a single packaged integrated circuit soldered to a main circuit board or a multi-chip module containing two or more integrated circuits.

The user interface circuitry 1018 may include one or more user interfaces designed to enable user interaction with the infrastructure equipment 1000 or peripheral component interfaces designed to enable peripheral component interaction with the infrastructure equipment 1000. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 1006 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1006, which incorporates both mmWave antennas and sub-mmWave.

The memory circuitry 1008 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. The memory circuitry 1008 may be implemented as one or more of solder down packaged integrated circuits, socketed memory modules and plug-in memory cards.

The PMIC 1010 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1012 may provide for electrical power drawn from a network cable to provide both power supply and data connectivity to the infrastructure equipment 1000 using a single cable.

The network controller circuitry 1014 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1000 via network interface connector 1020 using a physical connection, which may be electrical (commonly referred to as a "copper interconnect"), optical, or wireless. The network controller circuitry 1014 may include one or more dedicated processors and/or FPGAs to communicate using one or more of the aforementioned protocols. In some implementations, the network controller circuitry 1014 may include multiple controllers to provide connectivity to other networks using the same or different protocols.

The positioning circuitry 1016 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1016 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1016 may include a Micro-Technology for Positioning, Navigation, and Timing (Micro-PNT) IC that uses a master timing clock to perform position tracking/estimation without GNSS assistance. The positioning circuitry 1016 may also be part of, or interact with, the baseband circuitry 1004 and/or radio front end module 1006 to communicate with the nodes and components of the positioning network. The positioning circuitry 1016 may also provide position data and/or time data to the application circuitry 1002, which may use the data to synchronize operations with various infrastructure, or the like. The components shown by FIG. 10 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCix), PCI express (PCie), or any number of other technologies. The bus/IX may be a proprietary bus, for example, used in a SoC based system. Other bus/IX systems may be included, such as an I²C interface, an SPI interface, point to point interfaces, and a power bus, among others.

Figure 11:
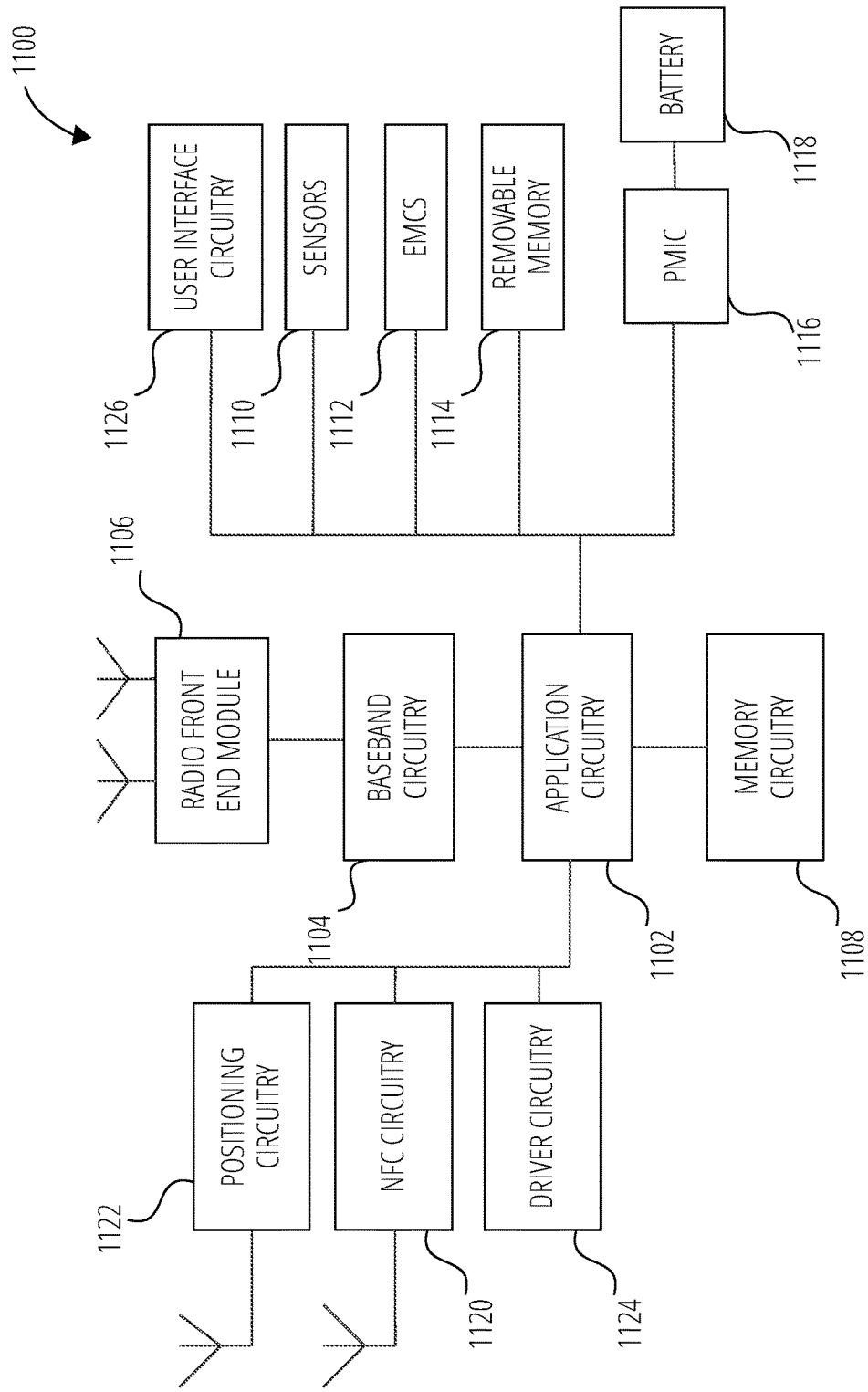
FIG. 11 illustrates a platform in accordance with one embodiment.

FIG. 11 illustrates an example of a platform 1100 in accordance with various embodiments. In embodiments, the computer platform 1100 may be suitable for use as UEs, application servers, and/or any other element/device discussed herein. The platform 1100 may include any combinations of the components shown in the example. The components of platform 1100 may be implemented as integrated circuits (ICs), portions thereof, discrete electronic devices, or other modules, logic, hardware, software, firmware, or a combination thereof adapted in the computer platform 1100, or as components otherwise incorporated within a chassis of a larger system. The block diagram of FIG. 11 is intended to show a high level view of components of the computer platform 1100. However, some of the components shown may be omitted, additional components may be present, and different arrangement of the components shown may occur in other implementations.

Application circuitry 1102 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose IO, memory card controllers such as SD MMC or similar, USB interfaces, MIPI interfaces, and JTAG test access ports. The processors (or cores) of the application circuitry 1102 may be coupled with or may include memory/storage elements and may be configured to execute instructions stored in the memory/storage to enable various applications or operating systems to run on the platform 1100. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1102 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1102 may comprise, or may be, a special-purpose processor/controller to operate according to the various embodiments herein.

As examples, the processor(s) of application circuitry 1102 may include an Intel® Architecture Core™ based processor, such as a Quark™, an Atom™, an i3, an i5, an i7, or an MCU-class processor, or another such processor available from Intel® Corporation. The processors of the application circuitry 1102 may also be one or more of Advanced Micro Devices (AMD) Ryzen® processor(s) or Accelerated Processing Units (APUs); AS-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1102 may be a part of a system on a chip (SoC) in which the application circuitry 1102 and other components are formed into a single integrated circuit, or a single package, such as the Edison™ or Galileo™ SoC boards from Intel® Corporation.

Additionally or alternatively, application circuitry 1102 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1102 may comprise logic blocks or logic fabric, and other interconnected resources that may be programmed to perform various functions, such as the procedures, methods, functions, etc. of the various embodiments discussed herein. In such embodiments, the circuitry of application circuitry 1102 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1104 may be implemented, for example, as a solder-down substrate including one or more integrated circuits, a single packaged integrated circuit soldered to a main circuit board or a multi-chip module containing two or more integrated circuits.

The radio front end module 1106 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1106, which incorporates both mmWave antennas and sub-mmWave.

The memory circuitry 1108 may include any number and type of memory devices used to provide for a given amount of system memory. As examples, the memory circuitry 1108 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 1108 may be developed in accordance with a Joint Electron Devices Engineering Council (JEDEC) low power double data rate (LPDDR)-based design, such as LPDDR2, LPDDR3, LPDDR4, or the like. Memory circuitry 1108 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1108 maybe on-die memory or registers associated with the application circuitry 1102. To provide for persistent storage of information such as data, applications, operating systems and so forth, memory circuitry 1108 may include one or more mass storage devices, which may include, inter alia, a solid state disk drive (SSDD), hard disk drive (HDD), a microHDD, resistance change memories, phase change memories, holographic memories, or chemical memories, among others. For example, the computer platform 1100 may incorporate the three-dimensional (3D) cross-point (XPOINT) memories from Intel® and Micron®.

The removable memory 1114 may include devices, circuitry, enclosures/housings, ports or receptacles, etc. used to couple portable data storage devices with the platform 1100. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1100 may also include interface circuitry (not shown) that is used to connect external devices with the platform 1100. The external devices connected to the platform 1100 via the interface circuitry include sensors 1110 and electro-mechanical components (shown as EMCs 1112), as well as removable memory devices coupled to removable memory 1114.

The sensors 1110 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1112 include devices, modules, or subsystems whose purpose is to enable platform 1100 to change its state, position, and/or orientation, or move or control a mechanism or (sub)system. Additionally, EMCs 1112 may be configured to generate and send messages/signaling to other components of the platform 1100 to indicate a current state of the EMCs 1112. Examples of the EMCs 1112 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1100 is configured to operate one or more EMCs 1112 based on one or more captured events and/or instructions or control signals received from a service provider and/or various clients. In some implementations, the interface circuitry may connect the platform 1100 with positioning circuitry 1122. The positioning circuitry 1122 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1122 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1122 may include a Micro-PNT IC that uses a master timing clock to perform position tracking/estimation without GNSS assistance. The positioning circuitry 1122 may also be part of, or interact with, the baseband circuitry 1104 and/or radio front end module 1106 to communicate with the nodes and components of the positioning network. The positioning circuitry 1122 may also provide position data and/or time data to the application circuitry 1102, which may use the data to synchronize operations with various infrastructure (e.g., radio base stations), for turn-by-turn navigation applications, or the like.

In some implementations, the interface circuitry may connect the platform 1100 with Near-Field Communication circuitry (shown as NFC circuitry 1120). The NFC circuitry 1120 is configured to provide contactless, short-range communications based on radio frequency identification (RFID) standards, wherein magnetic field induction is used to enable communication between NFC circuitry 1120 and NFC-enabled devices external to the platform 1100 (e.g., an "NFC touchpoint"). NFC circuitry 1120 comprises an NFC controller coupled with an antenna element and a processor coupled with the NFC controller. The NFC controller may be a chip/IC providing NFC functionalities to the NFC circuitry 1120 by executing NFC controller firmware and an NFC stack The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1120, or initiate data transfer between the NFC circuitry 1120 and another active NFC device (e.g., a smartphone or an NFC-enabled POS terminal) that is proximate to the platform 1100.

The driver circuitry 1124 may include software and hardware elements that operate to control particular devices that are embedded in the platform 1100, attached to the platform 1100, or otherwise communicatively coupled with the platform 1100. The driver circuitry 1124 may include individual drivers allowing other components of the platform 1100 to interact with or control various input/output (I/O) devices that may be present within, or connected to, the platform 1100. For example, driver circuitry 1124 may include a display driver to control and allow access to a display device, a touchscreen driver to control and allow access to a touchscreen interface of the platform 1100, sensor drivers to obtain sensor readings of sensors 1110 and control and allow access to sensors 1110, EMC drivers to obtain actuator positions of the EMCs 1112 and/or control and allow access to the EMCs 1112, a camera driver to control and allow access to an embedded image capture device, audio drivers to control and allow access to one or more audio devices.

The power management integrated circuitry (shown as PMIC 1116) (also referred to as "power management circuitry") may manage power provided to various components of the platform 1100. In particular, with respect to the baseband circuitry 1104, the PMIC 1116 may control power-source selection, voltage scaling, battery charging, or DC-to-DC conversion. The PMIC 1116 may often be included when the platform 1100 is capable of being powered by a battery 1118, for example, when the device is included in a UE.

In some embodiments, the PMIC 1116 may control, or otherwise be part of, various power saving mechanisms of the platform 1100. For example, if the platform 1100 is in an RRC_Connected state, where it is still connected to the RAN node as it expects to receive traffic shortly, then it may enter a state known as Discontinuous Reception Mode (DRX) after a period of inactivity. During this state, the platform 1100 may power down for brief intervals of time and thus save power. If there is no data traffic activity for an extended period of time, then the platform 1100 may transition off to an RRC_Idle state, where it disconnects from the network and does not perform operations such as channel quality feedback, handover, etc. The platform 1100 goes into a very low power state and it performs paging where again it periodically wakes up to listen to the network and then powers down again. The platform 1100 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1118 may power the platform 1100, although in some examples the platform 1100 may be mounted deployed in a fixed location, and may have a power supply coupled to an electrical grid. The battery 1118 may be a lithium ion battery, a metal-air battery, such as a zinc-air battery, an aluminum-air battery, a lithium-air battery, and the like. In some implementations, such as in V2X applications, the battery 1118 may be a typical lead-acid automotive battery.

In some implementations, the battery 1118 may be a "smart battery," which includes or is coupled with a Battery Management System (BMS) or battery monitoring integrated circuitry. The BMS may be included in the platform 1100 to track the state of charge (SoCh) of the battery 1118. The BMS may be used to monitor other parameters of the battery 1118 to provide failure predictions, such as the state of health (SoH) and the state of function (SoF) of the battery 1118. The BMS may communicate the information of the battery 1118 to the application circuitry 1102 or other components of the platform 1100. The BMS may also include an analog-to-digital (ADC) convertor that allows the application circuitry 1102 to directly monitor the voltage of the battery 1118 or the current flow from the battery 1118. The battery parameters may be used to determine actions that the platform 1100 may perform, such as transmission frequency, network operation, sensing frequency, and the like.

A power block, or other power supply coupled to an electrical grid may be coupled with the BMS to charge the battery 1118. In some examples, the power block may be replaced with a wireless power receiver to obtain the power wirelessly, for example, through a loop antenna in the computer platform 1100. In these examples, a wireless battery charging circuit may be included in the BMS. The specific charging circuits chosen may depend on the size of the battery 1118, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1126 includes various input/output (I/O) devices present within, or connected to, the platform 1100, and includes one or more user interfaces designed to enable user interaction with the platform 1100 and/or peripheral component interfaces designed to enable peripheral component interaction with the platform 1100. The user interface circuitry 1126 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1100. The output device circuitry may also include speakers or other audio emitting devices, printer(s), and/or the like. In some embodiments, the sensors 1110 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1100 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an I$^2$C interface, an SPI interface, point-to-point interfaces, and a power bus, among others.

Figure 12:
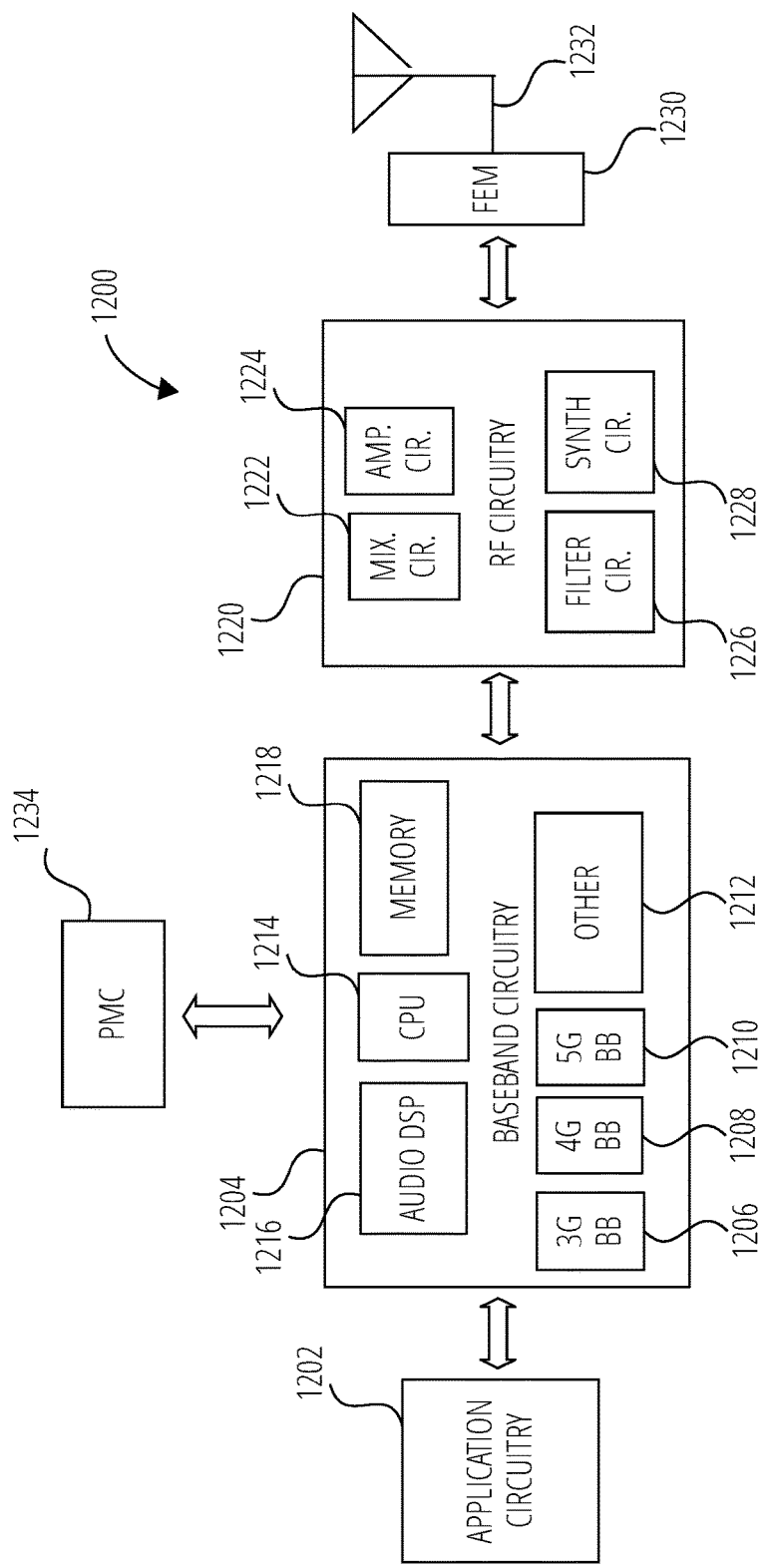
FIG. 12 illustrates a device in accordance with one embodiment.

FIG. 12 illustrates example components of a device 1200 in accordance with some embodiments. In some embodiments, the device 1200 may include application circuitry 1202, baseband circuitry 1204, Radio Frequency (RF) circuitry (shown as RF circuitry 1220), front-end module (FEM) circuitry (shown as FEM circuitry 1230), one or more antennas 1232, and power management circuitry (PMC) (shown as PMC 1234) coupled together at least as shown. The components of the illustrated device 1200 may be included in a UE or a RAN node. In some embodiments, the device 1200 may include fewer elements (e.g., a RAN node may not utilize application circuitry 1202, and instead include a processor/controller to process IP data received from an EPC). In some embodiments, the device 1200 may include additional elements such as, for example, memory/ storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1202 may include one or more application processors. For example, the application circuitry 1202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1200. In some embodiments, processors of application circuitry 1202 may process IP data packets received from an EPC.

The baseband circuitry 1204 may include circuitry such as, but not limited to, one or more single-core or multi-core processors. The baseband circuitry 1204 may include one or more baseband processors or control logic to process baseband signals received from a receive signal path of the RF circuitry 1220 and to generate baseband signals for a transmit signal path of the RF circuitry 1220. The baseband circuitry 1204 may interface with the application circuitry 1202 for generation and processing of the baseband signals and for controlling operations of the RF circuitry 1220. For example, in some embodiments, the baseband circuitry 1204 may include a third generation (3G) baseband processor (3G baseband processor 1206), a fourth generation (4G) baseband processor (4G baseband processor 1208), a fifth generation (5G) baseband processor (5G baseband processor 1210), or other baseband processor(s) 1212 for other existing generations, generations in development or to be developed in the future (e.g., second generation (2G), sixth generation (6G), etc.). The baseband circuitry 1204 (e.g., one or more of baseband processors) may handle various radio control functions that enable communication with one or more radio networks via the RF circuitry 1220. In other embodiments, some or all of the functionality of the illustrated baseband processors may be included in modules stored in the memory 1218 and executed via a Central Processing Unit (CPU 1214). The radio control functions may include, but are not limited to, signal modulation/demodulation, encoding/decoding, radio frequency shifting, etc. In some embodiments, modulation/demodulation circuitry of the baseband circuitry 1204 may include Fast-Fourier Transform (FFT), precoding, or constellation mapping/demapping functionality. In some embodiments, encoding/decoding circuitry of the baseband circuitry 1204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1204 may include a digital signal processor (DSP), such as one or more audio DSP(s) 1216. The one or more audio DSP(s) 1216 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1204 and the application circuitry 1202 may be implemented together such as, for example, on a system on a chip (SOC).

In some embodiments, the baseband circuitry 1204 may provide for communication compatible with one or more radio technologies. For example, in some embodiments, the baseband circuitry 1204 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 1204 is configured to support radio communications of more than one wireless protocol may be referred to as multi-mode baseband circuitry.

The RF circuitry 1220 may enable communication with wireless networks using modulated electromagnetic radiation through a non-solid medium. In various embodiments, the RF circuitry 1220 may include switches, filters, amplifiers, etc. to facilitate the communication with the wireless network. The RF circuitry 1220 may include a receive signal path which may include circuitry to down-convert RF signals received from the FEM circuitry 1230 and provide baseband signals to the baseband circuitry 1204. The RF circuitry 1220 may also include a transmit signal path which may include circuitry to up-convert baseband signals provided by the baseband circuitry 1204 and provide RF output signals to the FEM circuitry 1230 for transmission.

In some embodiments, the receive signal path of the RF circuitry 1220 may include mixer circuitry 1222, amplifier circuitry 1224 and filter circuitry 1226. In some embodiments, the transmit signal path of the RF circuitry 1220 may include filter circuitry 1226 and mixer circuitry 1222. The RF circuitry 1220 may also include synthesizer circuitry 1228 for synthesizing a frequency for use by the mixer circuitry 1222 of the receive signal path and the transmit signal path. In some embodiments, the mixer circuitry 1222 of the receive signal path may be configured to down-convert RF signals received from the FEM circuitry 1230 based on the synthesized frequency provided by synthesizer circuitry 1228. The amplifier circuitry 1224 may be configured to amplify the down-converted signals and the filter circuitry 1226 may be a low-pass filter (LPF) or band-pass filter (BPF) configured to remove unwanted signals from the down-converted signals to generate output baseband signals. Output baseband signals may be provided to the baseband circuitry 1204 for further processing. In some embodiments, the output baseband signals may be zero-frequency baseband signals, although this is not a requirement. In some embodiments, the mixer circuitry 1222 of the receive signal path may comprise passive mixers, although the scope of the embodiments is not limited in this respect.

In some embodiments, the mixer circuitry 1222 of the transmit signal path may be configured to up-convert input baseband signals based on the synthesized frequency provided by the synthesizer circuitry 1228 to generate RF output signals for the FEM circuitry 1230. The baseband signals may be provided by the baseband circuitry 1204 and may be filtered by the filter circuitry 1226.

In some embodiments, the mixer circuitry 1222 of the receive signal path and the mixer circuitry 1222 of the transmit signal path may include two or more mixers and may be arranged for quadrature downconversion and upconversion, respectively. In some embodiments, the mixer circuitry 1222 of the receive signal path and the mixer circuitry 1222 of the transmit signal path may include two or more mixers and may be arranged for image rejection (e.g., Hartley image rejection). In some embodiments, the mixer circuitry 1222 of the receive signal path and the mixer circuitry 1222 may be arranged for direct downconversion and direct upconversion, respectively. In some embodiments, the mixer circuitry 1222 of the receive signal path and the mixer circuitry 1222 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1220 may include analog-to-digital converter (ADC) and digital-to-analog converter (DAC) circuitry and the baseband circuitry 1204 may include a digital baseband interface to communicate with the RF circuitry 1220.

In some dual-mode embodiments, a separate radio IC circuitry may be provided for processing signals for each spectrum, although the scope of the embodiments is not limited in this respect.

In some embodiments, the synthesizer circuitry 1228 may be a fractional-N synthesizer or a fractional N/N+1 synthesizer, although the scope of the embodiments is not limited in this respect as other types of frequency synthesizers may be suitable. For example, synthesizer circuitry 1228 may be a delta-sigma synthesizer, a frequency multiplier, or a synthesizer comprising a phase-locked loop with a frequency divider.

The synthesizer circuitry 1228 may be configured to synthesize an output frequency for use by the mixer circuitry 1222 of the RF circuitry 1220 based on a frequency input and a divider control input. In some embodiments, the synthesizer circuitry 1228 may be a fractional N/N+1 synthesizer.

In some embodiments, frequency input may be provided by a voltage controlled oscillator (VCO), although that is not a requirement. Divider control input may be provided by either the baseband circuitry 1204 or the application circuitry 1202 (such as an applications processor) depending on the desired output frequency. In some embodiments, a divider control input (e.g., N) may be determined from a look-up table based on a channel indicated by the application circuitry 1202.

Synthesizer circuitry 1228 of the RF circuitry 1220 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1228 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1220 may include an IQ/polar converter.

The FEM circuitry 1230 may include a receive signal path which may include circuitry configured to operate on RF signals received from one or more antennas 1232, amplify the received signals and provide the amplified versions of the received signals to the RF circuitry 1220 for further processing. The FEM circuitry 1230 may also include a transmit signal path which may include circuitry configured to amplify signals for transmission provided by the RF circuitry 1220 for transmission by one or more of the one or more antennas 1232. In various embodiments, the amplification through the transmit or receive signal paths may be done solely in the RF circuitry 1220, solely in the FEM circuitry 1230, or in both the RF circuitry 1220 and the FEM circuitry 1230.

In some embodiments, the FEM circuitry 1230 may include a TX/RX switch to switch between transmit mode and receive mode operation. The FEM circuitry 1230 may include a receive signal path and a transmit signal path. The receive signal path of the FEM circuitry 1230 may include an LNA to amplify received RF signals and provide the amplified received RF signals as an output (e.g., to the RF circuitry 1220). The transmit signal path of the FEM circuitry 1230 may include a power amplifier (PA) to amplify input RF signals (e.g., provided by the RF circuitry 1220), and one or more filters to generate RF signals for subsequent transmission (e.g., by one or more of the one or more antennas 1232).

In some embodiments, the PMC 1234 may manage power provided to the baseband circuitry 1204. In particular, the PMC 1234 may control power-source selection, voltage scaling, battery charging, or DC-to-DC conversion. The PMC 1234 may often be included when the device 1200 is capable of being powered by a battery, for example, when the device 1200 is included in a UE. The PMC 1234 may increase the power conversion efficiency while providing desirable implementation size and heat dissipation characteristics.

FIG. 12 shows the PMC 1234 coupled only with the baseband circuitry 1204. However, in other embodiments, the PMC 1234 may be additionally or alternatively coupled with, and perform similar power management operations for, other components such as, but not limited to, the application circuitry 1202, the RF circuitry 1220, or the FEM circuitry 1230.

In some embodiments, the PMC 1234 may control, or otherwise be part of, various power saving mechanisms of the device 1200. For example, if the device 1200 is in an RRC_Connected state, where it is still connected to the RAN node as it expects to receive traffic shortly, then it may enter a state known as Discontinuous Reception Mode (DRX) after a period of inactivity. During this state, the device 1200 may power down for brief intervals of time and thus save power.

If there is no data traffic activity for an extended period of time, then the device 1200 may transition off to an RRC_Idle state, where it disconnects from the network and does not perform operations such as channel quality feedback, handover, etc. The device 1200 goes into a very low power state and it performs paging where again it periodically wakes up to listen to the network and then powers down again. The device 1200 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1202 and processors of the baseband circuitry 1204 may be used to execute elements of one or more instances of a protocol stack. For example, processors of the baseband circuitry 1204, alone or in combination, may be used to execute Layer 3, Layer 2, or Layer 1 functionality, while processors of the application circuitry 1202 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 13:
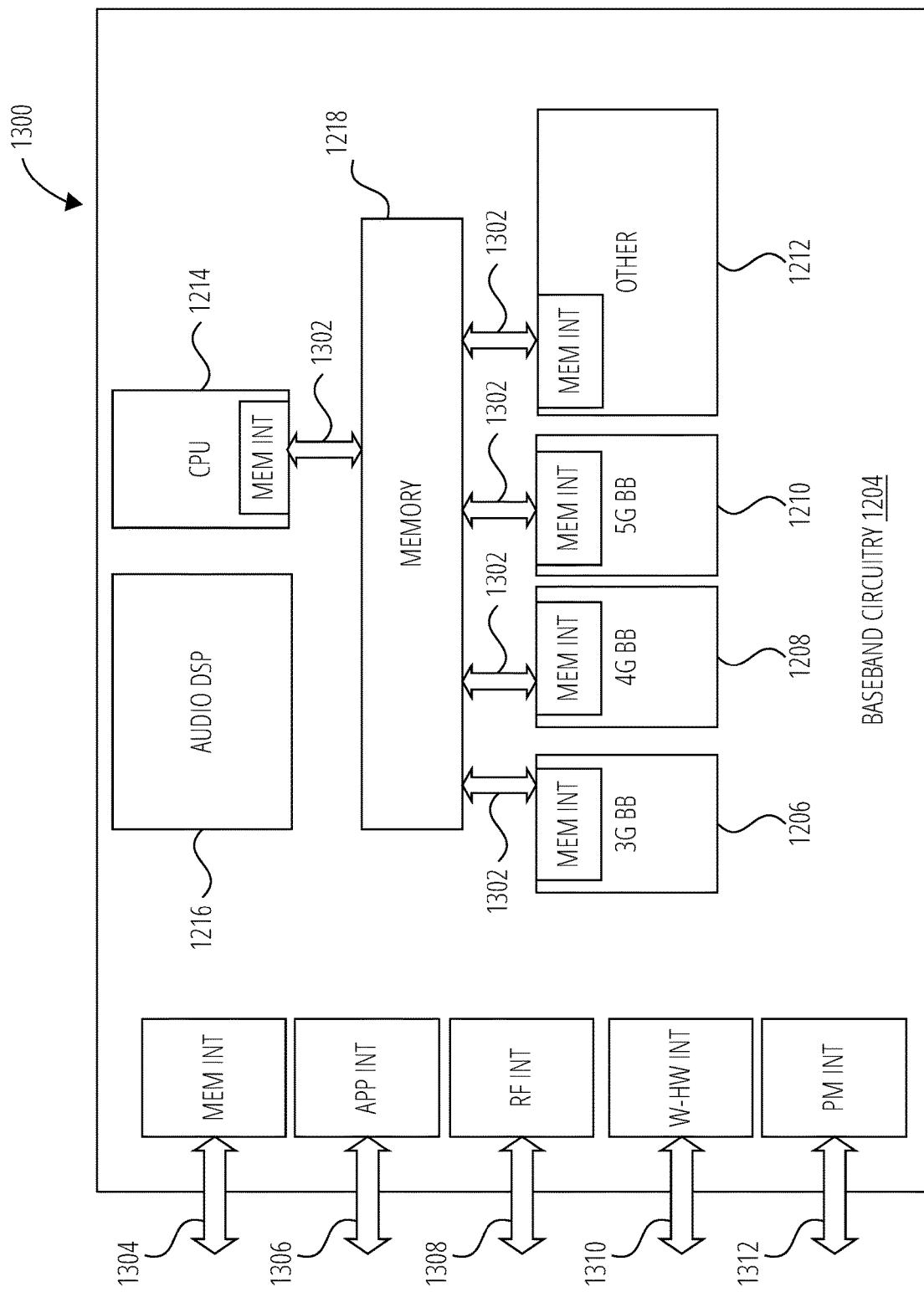
FIG. 13 illustrates example interfaces in accordance with one embodiment.

FIG. 13 illustrates example interfaces 1300 of baseband circuitry in accordance with some embodiments. As discussed above, the baseband circuitry 1204 of FIG. 12 may comprise 3G baseband processor 1206, 4G baseband processor 1208, 5G baseband processor 1210, other baseband processor(s) 1212, CPU 1214, and a memory 1218 utilized by said processors. As illustrated, each of the processors may include a respective memory interface 1302 to send/receive data to/from the memory 1218.

The baseband circuitry 1204 may further include one or more interfaces to communicatively couple to other circuitries/devices, such as a memory interface 1304 (e.g., an interface to send/receive data to/from memory external to the baseband circuitry 1204), an application circuitry interface 1306 (e.g., an interface to send/receive data to/from the application circuitry 1202 of FIG. 12), an RF circuitry interface 1308 (e.g., an interface to send/receive data to/from RF circuitry 1220 of FIG. 12), a wireless hardware connectivity interface 1310 (e.g., an interface to send/receive data to/from Near Field Communication (NFC) components, Bluetooth® components (e.g., Bluetooth® Low Energy), Wi-Fi® components, and other communication components), and a power management interface 1312 (e.g., an interface to send/receive power or control signals to/from the PMC 1234.

Figure 14:
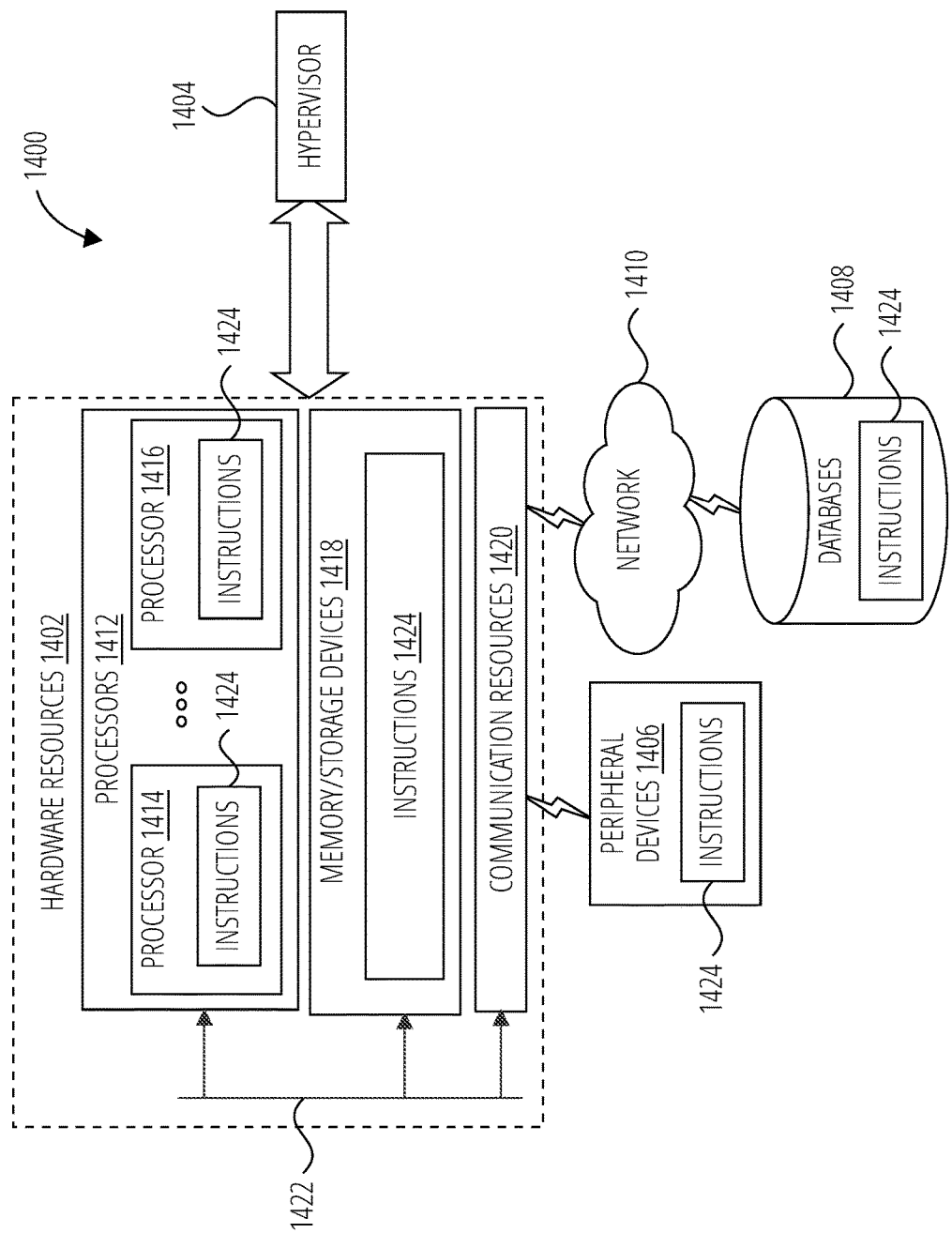
FIG. 14 illustrates components in accordance with one embodiment.

FIG. 14 is a block diagram illustrating components 1400, according to some example embodiments, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources 1402 including one or more processors 1412 (or processor cores), one or more memory/storage devices 1418, and one or more communication resources 1420, each of which may be communicatively coupled via a bus 1422. For embodiments where node virtualization (e.g., NFV) is utilized, a hypervisor 1404 may be executed to provide an execution environment for one or more network slices/sub-slices to utilize the hardware resources 1402.

The processors 1412 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1414 and a processor 1416.

The memory/storage devices 1418 may include main memory, disk storage, or any suitable combination thereof. The memory/storage devices 1418 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1420 may include interconnection or network interface components or other suitable devices to communicate with one or more peripheral devices 1406 or one or more databases 1408 via a network 1410. For example, the communication resources 1420 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1424 may comprise software, a program, an application, an applet, an app, or other executable code for causing at least any of the processors 1412 to perform any one or more of the methodologies discussed herein. The instructions 1424 may reside, completely or partially, within at least one of the processors 1412 (e.g., within the processor's cache memory), the memory/storage devices 1418, or any suitable combination thereof. Furthermore, any portion of the instructions 1424 may be transferred to the hardware resources 1402 from any combination of the peripheral devices 1406 or the databases 1408. Accordingly, the memory of the processors 1412, the memory/storage devices 1418, the peripheral devices 1406, and the databases 1408 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1A is an apparatus for allocating resources for DL PRSs in a wireless system. The apparatus includes a baseband processor a memory storing instructions that, when executed by the baseband processor, configure the apparatus to: configure a DL PRS resource pool comprising a periodically repeated amount of resources dedicated for DL PRS transmission by a plurality of base stations in the wireless communication system; divide the DL PRS resource pool into a plurality of DL PRS resource sets corresponding to one or more base station of the plurality of base stations; and generate configured DL PRS resources within the plurality of DL PRS resource sets for transmission of the DL PRSs.

Example 2A includes the apparatus of Example 1A, wherein to configure the DL PRS resource pool comprises to configure one or more parameters comprising: a unique DL PRS pool identifier (ID); a DL PRS pool bandwidth; a DL PRS pool periodicity defining an amount of time between two consecutive DL PRS pools; and a DL PRS pool time offset.

Example 3A includes the apparatus of Example A2, wherein the DL PRS pool time offset is defined in slots with respect to a predetermined system frame number (SFN).

Example 4A includes the apparatus of any of Example 1A to Example 3A, wherein to configure the DL PRS resource pool comprises to configure a DL PRS pool slot pattern to indicate which slots are configured for DL PRS transmission on a given DL PRS resource.

Example 5A includes the apparatus of Example 4A, wherein to configure the DL PRS pool slot pattern comprises to format a bitmap pattern to indicate each PRS allocated slot inside of the DL PRS resource pool.

Example 6A includes the apparatus of any of Example 1A to Example 3A, wherein to configure the DL PRS resource pool comprises to configure a DL PRS pool symbol pattern to indicate which symbols inside a slot are configured for DL PRS transmission on a given DL PRS resource.

Example 7A includes the apparatus of Example 6A, wherein to configure the DL PRS pool symbol pattern comprises to format a bitmap pattern to indicate each allocated symbol inside of each slot available for DL PRS transmission.

Example 8A includes the apparatus of Example 2A, wherein to configure the DL PRS pool bandwidth comprises one of: indicate a start and an end physical resource block (PRB) for the DL PRS resource pool with respect to reference point; indicate a PRB offset with respect to the reference point and a number of allocated PRBs for the DL PRS resource pool; or indicate a PRB allocation pattern defined as a bitmap with respect to the reference point.

Example 9A includes the apparatus of Example 1A, wherein to configure the DL PRS resource pool comprises to configure one or more parameters comprising: a resource set identifier (ID) to identify a configured DL PRS resource set; a cell ID to indicate to which cell the configured DL PRS resource set belongs; a list of DL PRS resource IDs to indicates DL PRS resources in the configured DL PRS resource set; a resource set type; a same transmit (TX) antenna port field to indicate whether a same spatial TX filter is applied across DL PRS resources within the configured DL PRS resource set; and a muting bitmap for activation and/or deactivation of DL PRS transmission occasions.

Example 10A includes the apparatus of Example 1A, wherein the configured DL PRS resources comprise one or more parameters selected from the group comprising: a resource element map pattern; a frequency shift of a defined DL PRS resource element mapping pattern; a transmit (TX) beam identifier (ID) to indicate a transmission beam used for DL PRS transmission; a number of antenna ports; a resource ID; an offset in time pointing to a first orthogonal frequency division multiplexing (OFDM) symbol where the configured DL PRS resource starts within the DL PRS resource pool; a resource duration; a sequence ID to generate one or more pseudo-random DL PRS sequences; and quasi-collocation information (TCI) state ID.

Example 11A includes the apparatus of Example 10A, wherein the resource element map pattern is based on N consecutive symbols comprising comb-N frequency allocation patterns corresponding to unique frequency shifts, wherein the value of N={1,2,3,4}.

Example 12A is a method for transmitting downlink (DL) positioning reference signals (PRSs) in a wireless system. The method comprises: configuring a DL PRS resource pool comprising a periodically repeated amount of resources dedicated for DL PRS transmission by a plurality of g node Bs (gNBs) in the wireless communication system; dividing the DL PRS resource pool into a plurality of DL PRS resource sets corresponding to one or more gNB of the plurality of the gNBs; and encoding the DL PRSs for transmission on configured DL PRS resources within the plurality of DL PRS resource sets.

Example 13A include the method of Example 12A, wherein configuring the DL PRS resource pool comprises configuring one or more parameters comprising: a unique DL PRS pool identifier (ID); a DL PRS pool bandwidth; a DL PRS pool periodicity defining an amount of time between two consecutive DL PRS pools; and a DL PRS pool time offset.

Example 14A include the method of Example 13A, wherein the DL PRS pool time offset is defined in slots with respect to a predetermined system frame number (SFN).

Example 15A include the method of any of Example 12A to Example 14A, wherein configuring the DL PRS resource pool comprises configuring a DL PRS pool slot pattern to indicate which slots are configured for DL PRS transmission on a given DL PRS resource.

Example 16A include the method of Example 15A, wherein configuring the DL PRS pool slot pattern comprises formatting a bitmap pattern indicating each PRS allocated slot inside of the DL PRS resource pool.

Example 17A include the method of any of Example 12A to Example 14A, wherein configuring the DL PRS resource pool comprises configuring a DL PRS pool symbol pattern to indicate which symbols inside a slot are configured for DL PRS transmission on a given DL PRS resource.

Example 18A include the method of Example 17A, wherein configuring the DL PRS pool symbol pattern comprises formatting a bitmap pattern indicating each allocated symbol inside of each slot available for DL PRS transmission.

Example 19A include the method of Example 13A, wherein configuring the DL PRS pool bandwidth comprises one of: providing an indication of a start and an end physical resource block (PRB) for the DL PRS resource pool with respect to reference point; providing an indication of a PRB offset with respect to the reference point and a number of allocated PRBs for the DL PRS resource pool; or providing an indication of a PRB allocation pattern defined as a bitmap with respect to the reference point.

Example 20A include the method of Example 12A, wherein configuring the DL PRS resource pool comprises configuring one or more parameters comprising: a resource set identifier (ID) to identify a configured DL PRS resource set; a cell ID to indicate to which cell the configured DL PRS resource set belongs; a list of DL PRS resource IDs to indicates DL PRS resources in the configured DL PRS resource set; a resource set type; a same transmit (TX) antenna port field to indicate whether a same spatial TX filter is applied across DL PRS resources within the configured DL PRS resource set; and a muting bitmap for activation and/or deactivation of DL PRS transmission occasions.

Example 21A include the method of Example 12A, wherein the configured DL PRS resources comprise one or more parameters selected from the group comprising: a resource element mapping pattern; a frequency shift of a defined DL PRS resource element mapping pattern; a transmit (TX) beam identifier (ID) to indicate a transmission beam used for DL PRS transmission; a number of antenna ports; a resource ID; an offset in time pointing to a first orthogonal frequency division multiplexing (OFDM) symbol where the configured DL PRS resource starts within the DL PRS resource pool; a resource duration; a sequence ID to generate one or more pseudo-random DL PRS sequences; and quasi-collocation information (TCI) state ID.

Example 22A include the method of Example 21A, wherein the resource element mapping pattern is based on N consecutive symbols comprising comb-N frequency allocation patterns corresponding to unique frequency shifts, wherein the value of N={1,2,3,4}.

Example 1B may include the method of NR DL PRS configuration is comprising of: configuration of NR DL PRS Resource Pool; configuration of NR DL PRS Resource Set; configuration of NR DL PRS Resource; configuration of NR DL PRS resource element mapping pattern; configuration of NR DL PRS sequence; and/or configuration of NR DL PRS BWP.

Example 2B may include the method of example 1B or some other example herein, wherein the NR DL PRS Resource Pool is configured be one or a combination of following parameters: DL PRS Pool Id, unique identifier; DL PRS Pool Bandwidth; DL PRS Pool Periodicity, Periodicity defines the amount of time between two consecutive DL PRS pools; DL PRS Pool Time Offset, offset IS defined in slots with respect to SFN=0; DL PRS Pool Slot Pattern, Indicates which slots are configured for DL PRS transmission on a given DL PRS resource; and/or DL PRS Pool Symbol Pattern, Indicates which symbols inside the slot are configured for DL PRS transmission on a given DL PRS resource.

Example 3B may include the method of example 2B or some other example herein, wherein the DL PRS Pool Bandwidth is configured, one or a combination of following rules is used for bandwidth determination for NR DL PRS: indication of start and end PRB for PRS resource pool with respect to reference Point A; indication of PRB offset with respect to reference Point A and number of allocated PRBs for DL PRS resource pool; indication of PRB allocation pattern defined as a bitmap with respect to reference Point A.

Example 4B may include the method of example 3B or some other example herein, wherein the DL PRS Pool Bandwidth is configured relatively to a reference Point A, this reference point A defined the point in the positioning DWP and predefined in the system.

Example 5B may include the method of example 2B or some other example herein, wherein the DL PRS Pool Slot Pattern is configured, which is comprising of a bitmap pattern indicating each allocated slot inside of the NR DL PRS Resource Pool.

Example 6B may include the method of example 2B or some other example herein, wherein the DL PRS Pool symbol pattern is configured, which is defined by one or a combination of following methods: bitmap pattern indicating each allocated symbol inside of the each slot available for NR DL PRS transmission, this pattern is predefined or signaled via higher layers; indicating of the number of symbols in the begging of each slot, which are not used for ND DL PRS transmission, this number is predefined or signaled via higher layers.

Example 7B may include the method of example 1B or some other example herein, wherein the NR DL PRS Resource Set is configured, in case if NR DL PRS Resource Pool is enabled, the NR DL PRS Resource is defined as a set of resources inside of the NR DL PRS Resource Pool, and all configuration parameters from PRS Resource Pool are applied to the PRS Resource Set.

Example 8B may include the method of example 1B or some other example herein, wherein the NR DL PRS Resource Set is configured, in case if NR DL PRS Resource Pool is enabled, the NR DL PRS Resource is defined independently and all configuration parameters from PRS Resource Pool are applied to the PRS Resource Set.

Example 9B may include the method of example 1B or some other example herein, wherein the NR DL PRS Resource Set is configured, one or a combination of following parameters define the PRS Resource Pool: Cell ID, which indicates to which cell the configured DL PRS Resource Set belongs to; Resource Set ID, identifies configured DL PRS Resource Set; List of DL PRS Resource IDs, which Indicates DL PRS Resources composing given DL PRS Resource Set; Resource Set Type (e.g., Periodic or semi-persistent); Same TX antenna port(s) (repetition), which indicates whether the same spatial TX filter is applied across all DL PRS Resources within a Set; Muting Bitmap for activation/deactivation of DL PRS transmission occasions, indicates whether given DL PRS transmission occasion is used for DL PRS transmission or not.

Example 10B may include the method of example 1B or some other example herein, wherein the NR DL PRS Resource is configured, DL PRS Resource is defined as a resource from DL PRS Resource Set.

Example 11B may include the method of example 1B or some other example herein, wherein the NR DL PRS Resource is configured, one or a combination of following parameters define the PRS Resource: Resource Element Mapping Pattern, which defines resource element mapping pattern for each symbol of DL PRS resource; Frequency shift, which points to the frequency shift of defined DL PRS resource element mapping pattern; Tx Beam ID, which indicates the transmission beam used for DL PRS transmission; Number of Ports, which indicates number of antenna ports per DL PRS resource (e.g., 1 or 2); Resource ID; Offset in time, which points to the first OFDM symbol where DL PRS resource starts within a DL PRS pool; Resource Duration, which may be a duration of a single DL PRS Resource (the notion of occasions may be applied to various DL PRS transmission schedules including DL PRS muting patterns across occasions); Sequence ID used to generate pseudo-random DL PRS sequence(s); and/or Quasi-Collocation Information (TCI state ID).

Example 12B may include the method of example 11B or some other example herein, wherein the NR DL PRS Resource is configured with resource element mapping pattern, the resource element mapping pattern is based on N consecutive symbols containing comb-N frequency allocation patterns each has a unique frequency shift. The value of N={1,2,3,4}.

Example 13B may include the method of example 11B or some other example herein, wherein the NR DL PRS Resource is configured, the total amount of resources allocated for each unique NR DL PRS Resource is equal.

Example 14B may include the method of example 11B or some other example herein, wherein the NR DL PRS Resource is configured, which is configurable by at least following UE specific configuration parameter: $N_{PRS\_ID}$ is dedicated for NR DL PRS configuration; A which is a parameter which is used to perform predefined NR DL PRS randomization in different periods of PRS Pool.

Example 15B may include the method of example 14B or some other example herein, wherein UE specific configuration parameter A is used for predefined NR DL PRS randomization, which depends on at least following parameters: SFN, number of Tx beam in DL PRS Resource Set, N, DL PRS Resource Pool period and $\Delta_{PRS\_init}$–gNB-specific parameter initial delta value. As an example, following formula can be used for randomization parameter calculation:

$$\Delta = \begin{cases} 0, & \text{randomization off} \\ (\Delta_{PRS\_init} + \lfloor SFN / N_{POOL\_PERIOD} \rfloor) \mod (N_{PRS\_POOL}), & \text{randomization on} \end{cases}$$

Example 16B may include the method of example 11B or some other example herein, wherein the NR DL PRS Resource is configured with frequency shift, which depends on system specific parameters: N; and UE-specific parameters: $N_{PRS\_ID}$, $\Delta$. As an example, following formula can be used for time shift calculation: frequency shift=$(N_{PRS\_ID}+\Delta)$ mod $N_{comb}$.

Example 17B may include the method of example 111B or some other example herein, wherein the NR DL PRS Resource is configured with time offset, which depends on system specific parameters: N, NPRS_RES and NPRS_SET_NUM–total number of DL PRS Resource Sets inside of the DL PRS Resource Pool; and UE-specific parameters: $N_{PRS\_ID}$, $\Delta$. As an example, following formula can be used for time shift calculation:

$$\text{time offset} = \left(\left\lfloor \frac{N_{PRS\_ID} + \Delta}{N_{comb}} \right\rfloor \mod N_{PRS\_SET\_NUM}\right) \cdot N_{PRS\_RES}.$$

Example 18B may include the method of example 111B or some other example herein, wherein the NR DL PRS Resource is configured with Tx beam Id, which depends on system specific parameters: N, NPRS_BEAM–number of Tx beams inside of the PRS Resource Set and NPRS_res_id–DL PRS resource Id; and UE-specific parameters: A. As an example, following formula can be used for Tx beam Id calculation:

$$Tx\,\text{beam}\,Id = \left\lfloor \frac{(N_{PRS\_res\_id} + \Delta)N_{comb}}{N_{PRS\_BEAM}} \right\rfloor.$$

Example 19B may include the method of example 11B or some other example herein, wherein the NR DL PRS Resource is configured with number of Tx antennas, which can be 1 or 2.

Example 20B may include the method of example 1B or some other example herein, wherein the NR DL PRS BWP is configured, which is separately defined in the system as a 'Positioning BWP' and can be separately configured on a UE. From UE perspective, it may imply processing of DL PRS signals only within 'positioning DL BWP'

Example 21B may include the method of example 20B or some other example herein, wherein Positioning BWP is defined, which is always aligned with NR DL PRS configuration parameters. In case if UE DL PRS processing bandwidth is less than the bandwidth of the configured DL PRS, gNB configures the 'positioning' DL BWP according to the UE processing capabilities Example 22B may include the method of example 20B or some other example herein, wherein Positioning BWP is defined, a UE does not need to switch, if 'positioning' DL BWP is allocated within active DL BWP. Assumptions of DL BWP switching are reused for DL PRS processing.

Example 23B may include the method of example 1B or some other example herein, wherein the NR DL PRS is configured, NR DL PRS from the serving cell can be associated by means of quasi-collocation with other reference signals (e.g. NR Rel.15/16). For that purpose, quasi-collocation signaling can be used. One or a combination of following options of DL PRS QCL are applied if applicable: DL PRS Resource(s) within DL PRS Resource Set is configured as quasi-collocated with each other using QCL Type-A; DL PRS Resource(s) within DL PRS Resource Set is configured as quasi-collocated with CSI-RS for tracking (TRS) using QCL Type-A and/or QCL Type-D; DL PRS Resource(s) within DL PRS Resource Set is configured as quasi-collocated with CSI-RS for beam management (BM) using QCL Type-D; DL PRS Resource(s) within DL PRS Resource Set is configured as quasi-collocated with SSB (SSB index) using QCL Type-C and/or Type-D.

Example 24B may include the method of example 1B or some other example herein, wherein NR DL PRS configuration is described, the ND DL PRS resource scheduling is support, two modes of DL PRS transmission scheduling are supported by NR: PRS Transmission Mode 1: based on Predefined PRS Transmission Schedule (PTM1), wherein PRS transmission pattern on a given PRS Resource is signaled to UE (e.g. pre-configured); PRS Transmission Mode 2: based on Pseudo-random PRS Transmission Schedule (PTM2), wherein PRS transmission on a given PRS Resource is controlled probabilistically (e.g. according to (pre-) configured probability of PRS transmission PPRS_TX), and Space (beam), time, frequency and code randomization techniques are applied for DL PRS transmission on dedicated resources.

Example 26B may include the method of example 25B or some other example herein, wherein pseudo-random NR DL PRS Resource scheduling is enabled, which is defined by one or a combination of following options: Spatial randomization (beam(s) for DL PRS transmission are randomly assigned); Time randomization (time resource(s) for DL PRS transmission are randomly assigned); Frequency randomization (frequency resource(s) for DL PRS transmission are randomly assigned); and/or Code randomization (sequence(s) for DL PRS transmission are randomly assigned).

Example 1C may include an apparatus comprising means to perform one or more elements of a method described in or related to any of the above Examples, or any other method or process described herein.

Example 2C may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 3C may include an apparatus comprising logic, modules, or circuitry to perform one or more elements of a method described in or related to any of the above Examples, or any other method or process described herein.

Example 4C may include a method, technique, or process as described in or related to any of the above Examples, or portions or parts thereof.

Example 5C may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 6C may include a signal as described in or related to any of the above Examples, or portions or parts thereof.

Example 7C may include a datagram, packet, frame, segment, protocol data unit (PDU), or message as described in or related to any of the above Examples, or portions or parts thereof, or otherwise described in the present disclosure.

Example 8C may include a signal encoded with data as described in or related to any of the above Examples, or portions or parts thereof, or otherwise described in the present disclosure.

Example 9C may include a signal encoded with a datagram, packet, frame, segment, PDU, or message as described in or related to any of the above Examples, or portions or parts thereof, or otherwise described in the present disclosure.

Example 10C may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 11C may include a computer program comprising instructions, wherein execution of the program by a processing element is to cause the processing element to carry out the method, techniques, or process as described in or related to any of the above Examples, or portions thereof.

Example 12C may include a signal in a wireless network as shown and described herein.

Example 13C may include a method of communicating in a wireless network as shown and described herein.

Example 14C may include a system for providing wireless communication as shown and described herein.

Example 15C may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. An apparatus for allocating resources for downlink (DL) positioning reference signals (PRSs) in a wireless communication system, the apparatus comprising:
 a baseband processor; and
 a memory storing instructions that, when executed by the baseband processor, configure the apparatus to:
   configure a DL PRS resource pool comprising a periodically repeated amount of resources dedicated for DL PRS transmission by a plurality of base stations in the wireless communication system;
   divide the DL PRS resource pool into a plurality of DL PRS resource sets corresponding to one or more base station of the plurality of base stations; and
   generate configured DL PRS resources within the plurality of DL PRS resource sets for transmission of the DL PRSs, wherein the configured DL PRS resources comprise a resource element map pattern based on N consecutive symbols comprising comb-N frequency allocation patterns corresponding to unique frequency shifts, wherein a value of N={1,2,3,4}.

2. The apparatus of claim 1, wherein to configure the DL PRS resource pool comprises to configure one or more parameters comprising:
 a unique DL PRS pool identifier (ID);
 a DL PRS pool bandwidth; a DL PRS pool periodicity defining an amount of time between two consecutive DL PRS pools; and
 a DL PRS pool time offset.

3. The apparatus of claim 2, wherein the DL PRS pool time offset is defined in slots with respect to a predetermined system frame number (SFN).

4. The apparatus of claim 1, wherein to configure the DL PRS resource pool comprises to configure a DL PRS pool slot pattern to indicate which slots are configured for DL PRS transmission on a given DL PRS resource.

5. The apparatus of claim 4, wherein to configure the DL PRS pool slot pattern comprises to format a bitmap pattern to indicate each PRS allocated slot inside of the DL PRS resource pool.

6. The apparatus of claim 1, wherein to configure the DL PRS resource pool comprises to configure a DL PRS pool symbol pattern to indicate which symbols inside a slot are configured for DL PRS transmission on a given DL PRS resource.

7. The apparatus of claim 6, wherein to configure the DL PRS pool symbol pattern comprises to format a bitmap pattern to indicate each allocated symbol inside of each slot available for DL PRS transmission.

8. The apparatus of claim 2, wherein to configure the DL PRS pool bandwidth comprises one of:
- indicate a start and an end physical resource block (PRB) for the DL PRS resource pool with respect to reference point;
- indicate a PRB offset with respect to the reference point and a number of allocated PRBs for the DL PRS resource pool; or
- indicate a PRB allocation pattern defined as a bitmap with respect to the reference point.

9. The apparatus of claim 1, wherein to configure the DL PRS resource pool comprises to configure one or more parameters comprising:
- a resource set identifier (ID) to identify a configured DL PRS resource set;
- a cell ID to indicate to which cell the configured DL PRS resource set belongs;
- a list of DL PRS resource IDs to indicate DL PRS resources in the configured DL PRS resource set;
- a resource set type;
- a same transmit (TX) antenna port field to indicate whether a same spatial TX filter is applied across DL PRS resources within the configured DL PRS resource set; and
- a muting bitmap for activation and/or deactivation of DL PRS transmission occasions.

10. A method for transmitting downlink (DL) positioning reference signals (PRSs) in a wireless communication system, the method comprising:
- configuring a DL PRS resource pool comprising a periodically repeated amount of resources dedicated for DL PRS transmission by a plurality of g node Bs (gNBs) in the wireless communication system;
- dividing the DL PRS resource pool into a plurality of DL PRS resource sets corresponding to one or more gNB of the plurality of the gNBs; and
- encoding the DL PRSs for transmission on configured DL PRS resources within the plurality of DL PRS resource sets, wherein the configured DL PRS resources comprise a resource element map pattern based on N consecutive symbols comprising comb-N frequency allocation patterns corresponding to unique frequency shifts, wherein a value of N={1,2,3,4}.

11. The method of claim 10, wherein configuring the DL PRS resource pool comprises configuring one or more parameters comprising:
- a unique DL PRS pool identifier (ID);
- a DL PRS pool bandwidth;
- a DL PRS pool periodicity defining an amount of time between two consecutive DL PRS pools; and
- a DL PRS pool time offset.

12. The method of claim 11, wherein the DL PRS pool time offset is defined in slots with respect to a predetermined system frame number (SFN).

13. The method of claim 10, wherein configuring the DL PRS resource pool comprises configuring a DL PRS pool slot pattern to indicate which slots are configured for DL PRS transmission on a given DL PRS resource.

14. The method of claim 13, wherein configuring the DL PRS pool slot pattern comprises formatting a bitmap pattern indicating each PRS allocated slot inside of the DL PRS resource pool.

15. The method of claim 10, wherein configuring the DL PRS resource pool comprises configuring a DL PRS pool symbol pattern to indicate which symbols inside a slot are configured for DL PRS transmission on a given DL PRS resource.

16. The method of claim 15, wherein configuring the DL PRS pool symbol pattern comprises formatting a bitmap pattern indicating each allocated symbol inside of each slot available for DL PRS transmission.

17. The method of claim 11, wherein configuring the DL PRS pool bandwidth comprises one of:
- providing an indication of a start and an end physical resource block (PRB) for the DL PRS resource pool with respect to reference point;
- providing an indication of a PRB offset with respect to the reference point and a number of allocated PRBs for the DL PRS resource pool;
- or providing an indication of a PRB allocation pattern defined as a bitmap with respect to the reference point.

18. The method of claim 10, wherein configuring the DL PRS resource pool comprises configuring one or more parameters comprising:
- a resource set identifier (ID) to identify a configured DL PRS resource set;
- a cell ID to indicate to which cell the configured DL PRS resource set belongs;
- a list of DL PRS resource IDs to indicate DL PRS resources in the configured DL PRS resource set;
- a resource set type;
- a same transmit (TX) antenna port field to indicate whether a same spatial TX filter is applied across DL PRS resources within the configured DL PRS resource set; and
- a muting bitmap for activation and/or deactivation of DL PRS transmission occasions.

* * * * *